US011983221B2

(12) United States Patent
Wills et al.

(10) Patent No.: US 11,983,221 B2
(45) Date of Patent: *May 14, 2024

(54) METHOD, APPARATUS AND COMPUTER PROGRAM PRODUCT FOR GENERATING TIERED SEARCH INDEX FIELDS IN A GROUP-BASED COMMUNICATION PLATFORM

(71) Applicant: Salesforce, Inc., San Francisco, CA (US)

(72) Inventors: Joshua Wills, San Francisco, CA (US); Luis Tandalla, New York, NY (US); Japinder Singh, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,274

(22) Filed: Oct. 12, 2022

(65) Prior Publication Data

US 2023/0037222 A1 Feb. 2, 2023

Related U.S. Application Data

(63) Continuation of application No. 16/885,885, filed on May 28, 2020, now Pat. No. 11,500,930.

(Continued)

(51) Int. Cl.
*G06F 7/00* (2006.01)
*G06F 16/901* (2019.01)
(Continued)

(52) U.S. Cl.
CPC ........ *G06F 16/902* (2019.01); *G06F 16/9032* (2019.01); *G06F 16/9035* (2019.01); *G06F 16/906* (2019.01); *G06N 20/00* (2019.01)

(58) Field of Classification Search
CPC ............... G06F 16/902; G06F 16/9032; G06F 16/9035; G06F 16/906; G06N 20/00
See application file for complete search history.

(56) References Cited

U.S. PATENT DOCUMENTS

| 5,488,725 A * | 1/1996 | Turtle | G06F 16/93 |
| | | | 707/999.005 |
| 2011/0093459 A1 * | 4/2011 | Dong | G06F 16/9535 |
| | | | 707/E17.014 |

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Mohammed R Uddin
(74) *Attorney, Agent, or Firm* — Holland & Hart LLP

(57) ABSTRACT

Methods, apparatus and computer program product for generating tiered search index fields based on a divided group-based communication data corpus in a group-based communication platform are described herein. In some embodiments, the system provides for receiving a group-based communication data corpus, generating a retrieval score, and assigning each group-based communication data object associated with a retrieval score. Each group-based communication data object may meet or exceed a retrieval score threshold of a high retrieval probability corpus. Each group-based communication data object associated with a retrieval score below the retrieval score threshold may be assigned to a low retrieval probability corpus. High and a low retrieval probability search index fields may be generated and associated with the high and low retrieval probability corpus.

20 Claims, 21 Drawing Sheets

Related U.S. Application Data

(60) Provisional application No. 62/853,608, filed on May 28, 2019.

(51) Int. Cl.
  *G06F 16/9032* (2019.01)
  *G06F 16/9035* (2019.01)
  *G06F 16/906* (2019.01)
  *G06N 20/00* (2019.01)

(56) References Cited

U.S. PATENT DOCUMENTS

| | | | | |
|---|---|---|---|---|
| 2012/0130996 | A1* | 5/2012 | Risvik | G06F 16/24578 707/723 |
| 2018/0287982 | A1 | 10/2018 | Draeger et al. | |
| 2019/0171742 | A1* | 6/2019 | Cohen | G06F 16/24553 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

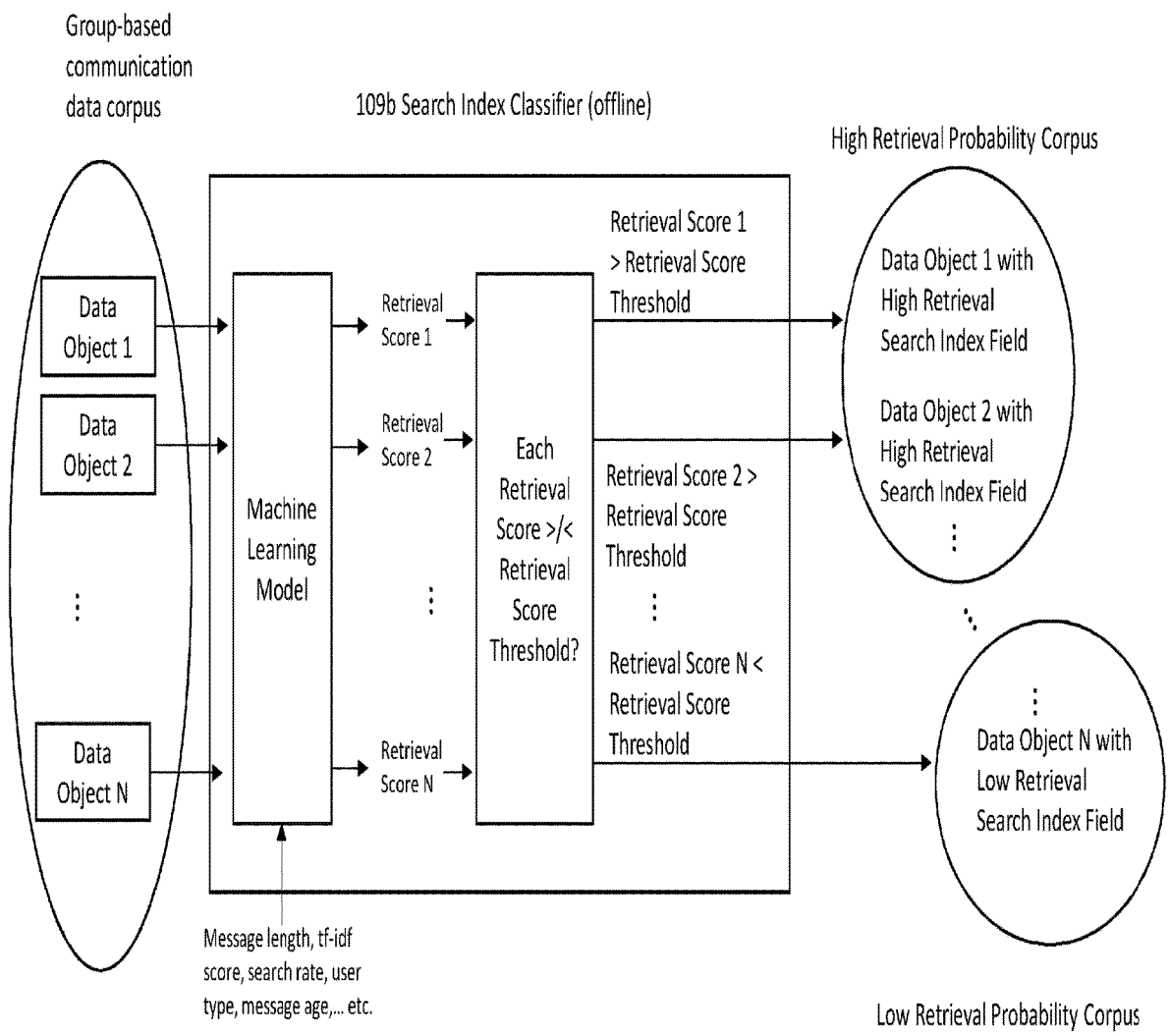
FIG. 4A (Offline Phase)

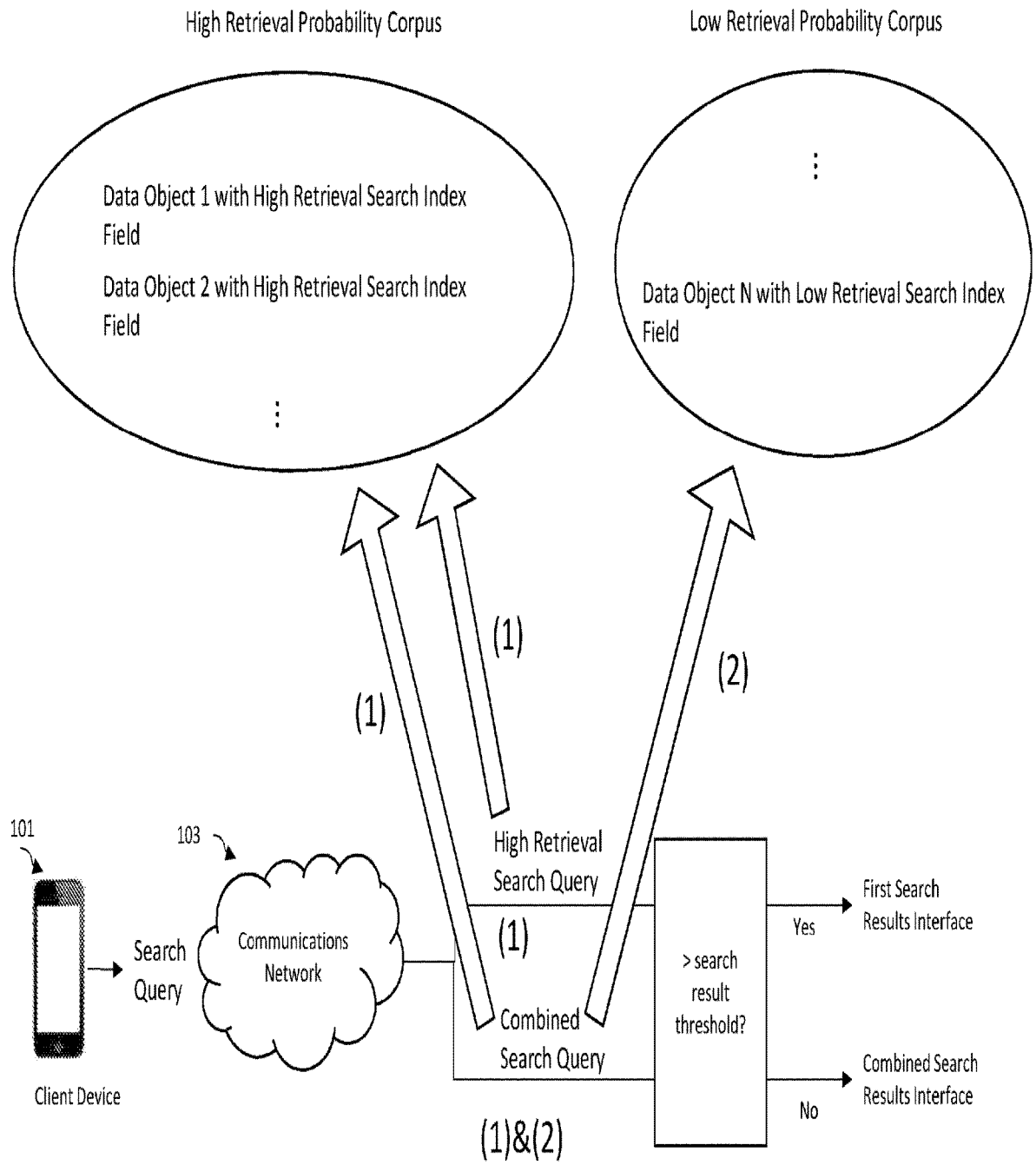
FIG. 4B (Online Phase)

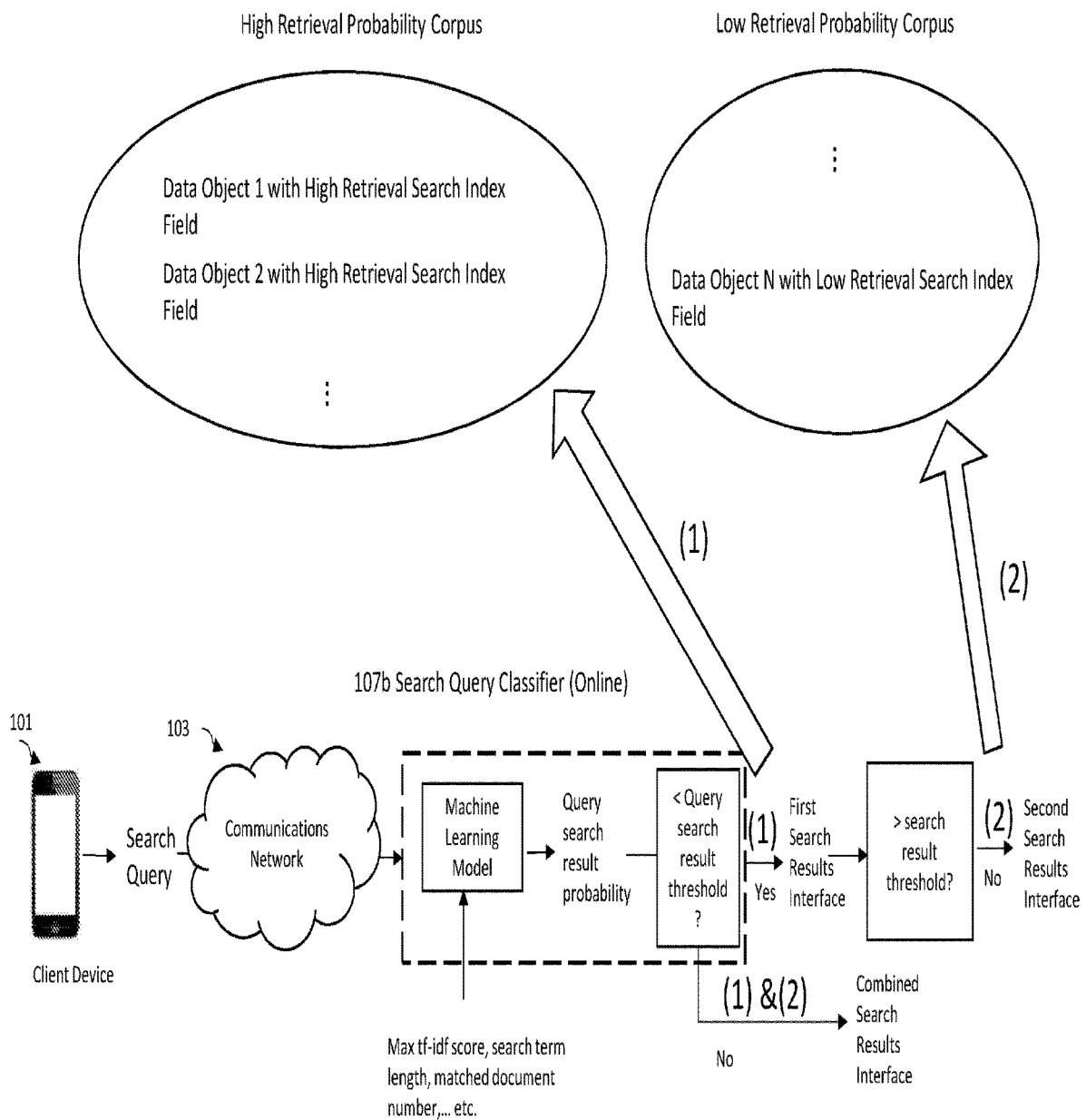
FIG. 4C (Online Phase)

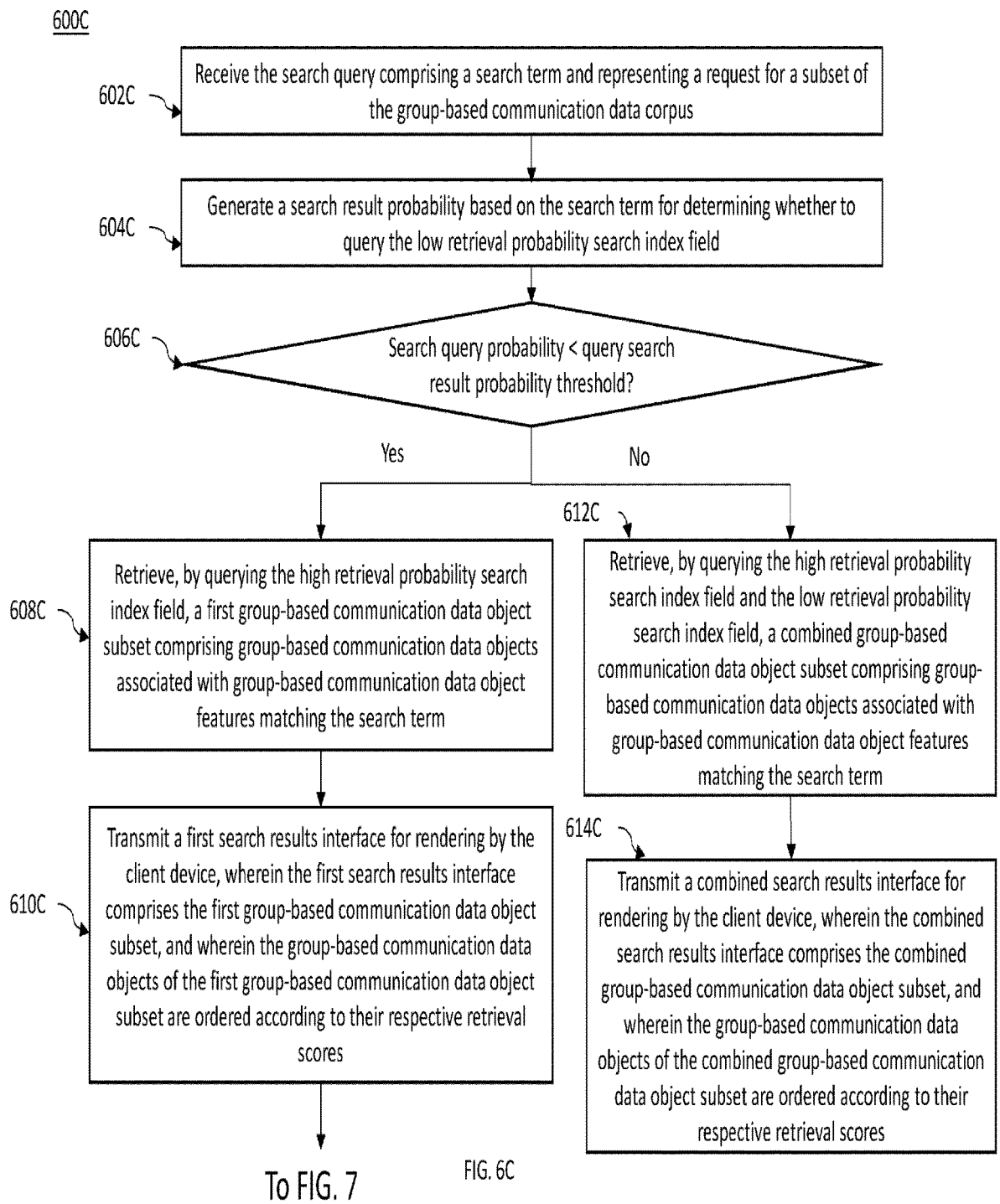

METHOD, APPARATUS AND COMPUTER PROGRAM PRODUCT FOR GENERATING TIERED SEARCH INDEX FIELDS IN A GROUP-BASED COMMUNICATION PLATFORM

RELATED APPLICATIONS

This patent application is a continuation application claiming priority benefit, with regard to all common subject matter, of U.S. patent application Ser. No. 16/885,885, filed May 28, 2020, and entitled "METHOD, APPARATUS AND COMPUTER PROGRAM PRODUCT FOR GENERATING TIERED SEARCH INDEX FIELDS IN A GROUP-BASED COMMUNICATION PLATFORM" ("the '885 Application"). The '885 Application claims priority benefit, with regard to all common subject matter, of U.S. Provisional Patent Application No. 62/853,608 filed May 28, 2019, and entitled "METHOD, APPARATUS AND COMPUTER PROGRAM PRODUCT FOR GENERATING TIERED SEARCH INDEX FIELDS IN A GROUP-BASED COMMUNICATION PLATFORM." The identified earlier-filed applications are hereby incorporated by reference in their entirety into the present application.

TECHNICAL FIELD

Various methods, apparatuses, and systems are configured to manage data search index fields for retrieving data in response to a search query. Many deficiencies and problems associated with existing methods, apparatus, and systems have been identified. Through applied effort, ingenuity, and innovation, these identified deficiencies and problems have been solved by developing solutions that are in accordance with the embodiments of the present disclosure, many examples of which are described in detail herein.

Typical systems and methods may attempt to address the above data search index management issues through generating non-tiered search index fields based on data features (e.g., data types, data formats, data creation time, etc.) of each group-based communication data object. Upon receiving a search query from a particular user, existing systems and approaches may search each non-tiered search index field associated with each group-based communication data object to find matched to the search query. However, conventional methods can be time consuming, while exhausting network resources. For example, in circumstances where a database storing the group-based communication data objects comprises a large amount of data, the response time to the search query will be extremely slow due to performing an exhaustive search for the non-tiered search index field associated with each group-based communication data object. The required entire database search may exhaust network resources, and decrease the robustness of the group-based communication platform.

Systems structured in accordance with various embodiments of the disclosure overcome challenges faced by existing systems by way of utilizing tiered search index fields to divide group-based communication data objects according to a retrieval probability for each group-based communication data object. For example, in some embodiments of the present disclosure, the systems use tiered search index fields for dividing group-based communication data objects into a high retrieval probability corpus and a low retrieval probability corpus through generating a retrieval score for each group-based communication data object. In one embodiment, upon receiving a search query from a client device, the systems may query the high retrieval search index field and query both the high and the low retrieval search index fields in parallel for retrieving group-based communication data objects matching the search query. In such an example, the systems may further determine, based on a total number of group-based communication data objects retrieved via the high retrieval search index field and a search result threshold, to transmit a search results interface generated by only retrieving the high retrieval probability corpus or a combined search result interface generated by retrieving both the high and low retrieval probability corpora.

In another embodiment, upon receiving a search query, the systems may first determine a likelihood of retrieving the low retrieval probability corpus. If the likelihood of retrieving the low retrieval probability corpus is low, the systems may first search the high retrieval probability corpus for finding group-based communication data objects matching the search query, and only when a total number of the matched group-based communication data objects appearing in search results fails to meet a threshold value, the systems will conduct a second search in the low retrieval probability corpus. If the likelihood of retrieving the low retrieval probability corpus is high, the systems may search the high retrieval probability corpus and the low retrieval probability corpus in parallel. Through generating tiered search index fields, the systems may shorten response time and reduce network resources in response to a search query. Specifically, when the systems determine that the likelihood of retrieving the low retrieval probability corpus is low, the systems in the present disclosure only need to search a subset of group-based communication data objects with high retrieval probability, instead of searching each group-based communication data object stored in the database.

Moreover, the number of group-based communication data objects appearing within a search results interface is not reduced or negatively impacted due to the reduced amount of group-based communication data objects being queried. Embodiments if the present disclosure ensure this by performing a check on the total number of group-based communication data objects appearing on a search results interface, and search the low retrieval probability corpus for retrieving additional group-based communication data objects if necessary. These features of the present disclosure decrease data volumes to be searched in response to a search query, and thus may shorten the response time and save network resources for operating search functionalities in response to the search query.

As such, systems structured in accordance with various embodiments of the disclosure provide specific, technical solutions to technical problems faced by existing systems, the details of which are described hereinafter.

SUMMARY

Embodiments of the present disclosure address the above-described needs by providing methods, apparatuses, systems, computing devices, and/or the like for generating tiered search index fields based on a divided group-based communication data corpus in a group-based communication platform.

In accordance with one aspect, an apparatus is provided. The apparatus comprises at least one processor and at least one non-transitory computer-readable memory comprising computer-executable instructions. The at least one non-transitory memory and the computer-executable instructions, when executed by the at least one processor, are configured to cause the apparatus to at least receive a group-based communication data corpus comprising a plurality of group-based communication data objects, where each group-based communication data object of the plurality of group-based communication data objects is associated with a group-based communication data object feature data structure. The at least one non-transitory memory and the computer-executable instructions, when executed by the at least one processor, are configured to further cause the apparatus to generate a retrieval score for each group-based communication data object of the plurality of group-based communication data objects, wherein the retrieval score represents a programmatically generated likelihood that a respective group-based communication data object will appear in search results responsive to a search query received from a client device associated with a particular user. The at least one non-transitory memory and the computer-executable instructions, when executed by the at least one processor, are configured to further cause the apparatus to assign each group-based communication data object that is associated with a retrieval score meeting or exceeding a retrieval score threshold to a high retrieval probability corpus, and assign each group-based communication data object that is associated with a retrieval score below the retrieval score threshold to a low retrieval probability corpus. The at least one non-transitory memory and the computer-executable instructions, when executed by the at least one processor, are configured to further cause the apparatus to generate a high retrieval probability search index field to be associated with the high retrieval probability corpus, and generate a low retrieval probability search index field to be associated with the low retrieval probability corpus. In accordance with another aspect, The at least one non-transitory memory and the computer-executable instructions, when executed by the at least one processor, are configured to further cause the apparatus to receive, from the client device, the search query comprising a search term and representing a request for a subset of the group-based communication data corpus. The at least one non-transitory memory and the computer-executable instructions, when executed by the at least one processor, are configured to further cause the apparatus to retrieve, by querying the high retrieval probability search index field, a first group-based communication data object subset comprising group-based communication data objects associated with group-based communication data object features matching the search term. The at least one non-transitory memory and the computer-executable instructions, when executed by the at least one processor, are configured to further cause the apparatus to retrieve, by querying the high retrieval probability search index field and the low retrieval probability search index field, a combined group-based communication data object subset comprising group-based communication data objects associated with group-based communication data object features matching the search term.

Upon determining that a number of group-based communication data objects of the first group-based communication data object subset meets or exceeds a search result threshold, The at least one non-transitory memory and the computer-executable instructions, when executed by the at least one processor, are configured to further cause the apparatus to transmit, to the client device, a first search results interface for rendering by the client device, wherein the first search results interface comprises the first group-based communication data object subset, and wherein the group-based communication data objects of the first group-based communication data object subset are ordered according to their respective retrieval scores. Upon determining that the number of group-based communication data objects of the first group-based communication data object subset is below the search result threshold, The at least one non-transitory memory and the computer-executable instructions, when executed by the at least one processor, are configured to further cause the apparatus to, transmit, to the client device, the combined search results interface for rendering by the client device, wherein the combined search results interface comprises the combined group-based communication data object subset, and wherein the group-based communication data objects of the combined group-based communication data object subset are ordered according to their respective retrieval scores.

In accordance with another aspect, The at least one non-transitory memory and the computer-executable instructions, when executed by the at least one processor, are configured to further cause the apparatus to receive, from the client device, the search query that comprises a search term and represents a request for a subset of the group-based communication data corpus. The at least one non-transitory memory and the computer-executable instructions, when executed by the at least one processor, are configured to further cause the apparatus to generate a query search result probability based on the search term for determining whether to query the low retrieval probability search index field.

Upon determining that the query search result probability is below a query search result probability threshold, The at least one non-transitory memory and the computer-executable instructions, when executed by the at least one processor, are configured to further cause the apparatus to retrieve, by querying the high retrieval probability search index field, a first group-based communication data object subset comprising group-based communication data objects associated with group-based communication data object features matching the search term. The at least one non-transitory memory and the computer-executable instructions, when executed by the at least one processor, are configured to further cause the apparatus to transmit, to the client device, a first search results interface for rendering by the client device, wherein the first search results interface comprises the first group-based communication data object subset, and wherein the group-based communication data objects of the first group-based communication data object subset are ordered according to their respective retrieval scores. Upon determining that a number of group-based communication data objects of the first group-based communication data objects subset is below a search result threshold The at least one non-transitory memory and the computer-executable instructions, when executed by the at least one processor, are configured to further cause the apparatus to retrieve, by querying the low retrieval probability search index field, a second group-based communication data object subset comprising group-based communication data objects associated with group-based communication data object features matching the search term. The at least one non-transitory memory and the computer-executable instructions, when executed by the at least one processor, are configured to further cause the apparatus to transmit, to the client device, a second search results interface for rendering by the client device, wherein the second search results interface comprises the first group-based communication data object subset and at least part of the second group-based communication data object subset, and wherein the group-based communication data objects of the first and second group-based communication data object subsets are ordered according to their respective retrieval scores.

Upon determining that the query search result probability is higher than a query search result probability threshold, The at least one non-transitory memory and the computer-executable instructions, when executed by the at least one processor, are configured to further cause the apparatus to retrieve, by querying the high retrieval probability search index field and the low retrieval probability search index field, a combined group-based communication data object subset comprising group-based communication data objects associated with group-based communication data object features matching the search term. The at least one non-transitory memory and the computer-executable instructions, when executed by the at least one processor, are configured to further cause the apparatus to transmit, to the client device, a combined search results interface for rendering by the client device, wherein the combined search results interface comprises the combined group-based communication data object subset, and wherein the group-based communication data objects of the combined group-based communication data object subset are ordered according to their respective retrieval scores.

In accordance with another aspect, The at least one non-transitory memory and the computer-executable instructions, when executed by the at least one processor, are configured to further cause the apparatus to generate a relevancy score for each group-based communication data object of the plurality of group-based communication data objects, the relevancy score representing a likelihood that the respective group-based communication data object having one or more group-based communication data object features matching to the search query. In such an aspect The at least one non-transitory memory and the computer-executable instructions, when executed by the at least one processor, are configured to further cause the apparatus to transmit, to the client device, a first retrieval-relevancy search results interface, a second retrieval-relevancy search results interface, or a combined retrieval-relevancy search results interface for rendering by the client device, wherein the first retrieval-relevancy search results interface, the second retrieval-relevancy search results interface, or the combined retrieval-relevancy search results interface comprises the group-based communication data objects that are ordered according to their respective retrieval scores and relevancy scores.

In accordance with another aspect The at least one non-transitory memory and the computer-executable instructions, when executed by the at least one processor, are configured to further cause the apparatus to generate a recency score for each group-based communication data object of the plurality of group-based communication data objects, the recency score representing a network timespan between a group-based communication data object creation time and a search query receiving time. In such an aspect, The at least one non-transitory memory and the computer-executable instructions, when executed by the at least one processor, are configured to further cause the apparatus to transmit, to the client device, a first retrieval-recency search results interface, a second retrieval-recency search results interface, or a combined retrieval-recency search results interface for rendering by the client device, wherein the first retrieval-relevancy search results interface, the second retrieval-relevancy search results interface, or the combined retrieval-recency search results interface comprises the group-based communication data objects that are ordered according to their respective retrieval scores and recency scores.

In various embodiments, the programmatically generated likelihood is generated by a machine learning model based at least on a message length, a term frequency-inverse document frequency (tf-idf) score, a historical group message search rate, a historical channel message search rate, a historical user message search rate, a historical user-channel message search rate, a user type, a message age, an activity notification, a message format, a message type, a reply count, or a message source.

In various embodiments, the query search result probability is generated by a machine learning model based at least on a maximum tf-idf score, a search term length, or a matched document number associated with the search term.

In various embodiments, the plurality of group-based communication data objects comprises at least a work object, a user profile object, a channel profile object, or a group profile object.

In various embodiments, the group-based communication data object feature is associated with at least a message length, a user type, a message age, an activity notification, a message format, a message type, a reply count, or a message source.

In various embodiments, the search term comprises one or more of a keyword, a character, or a number.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWING FIGURES

Having thus described some embodiments in general terms, references will now be made to the accompanying drawings, which are not drawn to scale, and wherein:

FIG. 4A depicts an example flow chart illustrating an example method for generating tiered search index fields based on retrieval scores, in accordance with some embodiments of the present disclosure;

FIG. 4B depicts an example flow chart illustrating an example method for generating search results interfaces in response to search queries, in accordance with some embodiments of the present disclosure;

FIG. 4C depicts an example flow chart illustrating an example method for generating search results interfaces based on a search query classifier in response to search queries, in accordance with some embodiments of the present disclosure;

Figure 1:
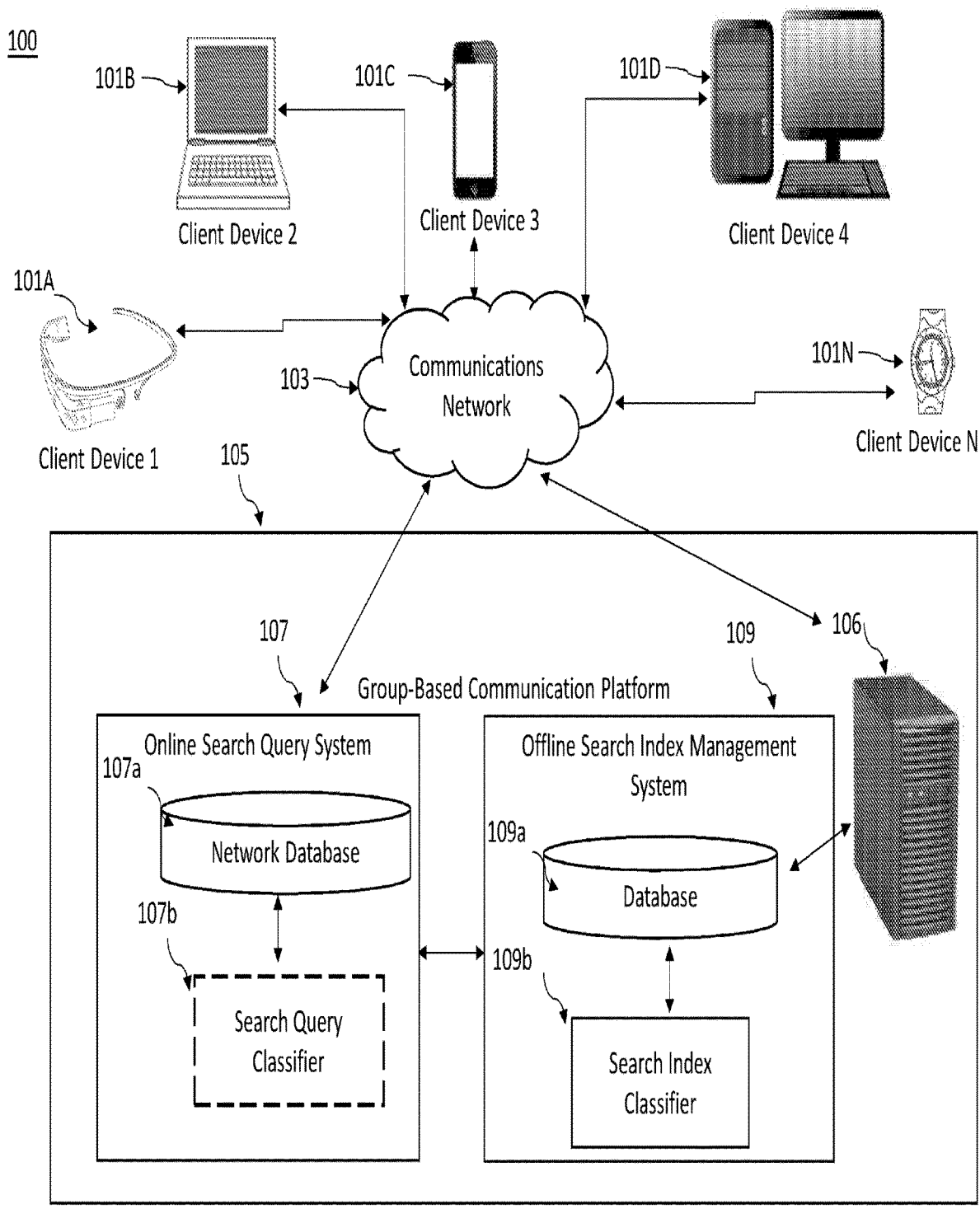
FIG. 1 depicts an example system infrastructure diagram of a group-based communication system in accordance with some embodiments of the present disclosure.

FIGS. 5, 6A, 6B, 6C, and 7 depict example flow charts illustrating example methods for generating tiered search index fields and rendering a search results interface that is ordered according to retrieval scores, in accordance with some embodiments of the present disclosure;

FIGS. 8, 9A, 9B, 9C, and 10 depict example flow charts illustrating example methods for generating tiered search index fields and rendering a search results interface that is ordered according to retrieval scores and relevancy scores, in accordance with some embodiments of the present disclosure; and FIGS. 11, 12A, 12B, 12C, and 13 depict example flow charts illustrating example methods for generating tiered search index fields and rendering a search results interface that is ordered according to retrieval scores and recency scores, in accordance with some embodiments of the present disclosure.

DETAILED DESCRIPTION

Various embodiments of the disclosure generally relate to a method for generating tiered search index fields based on a divided group-based communication data corpus in a group based communication platform. More specifically, various embodiments of the present disclosure are related to assigning each group-based communication data object to a high retrieval probability corpus or a low retrieval probability corpus, associating each group-based communication data object of the high retrieval probability corpus with a high retrieval probability index field, and associating each group-based communication data object of the low retrieval probability corpus with a low retrieval probability index field. Various embodiments of the disclosure utilize tiered search index fields to provide improvements in data search index management so as to shorten response time for retrieving an ordered search results interface in response to a search query.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. In general, client devices are computer hardware and/or software configured to access services available to the server. Client devices may include, without limitation, smart phones, tablet computers, laptop computers, wearables, personal computers, enterprise computers, and the like. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication platform 105 via a communications network 103 using client devices 101A-101N. The group-based communication platform 105 may comprise a group-based communication server 106, and an online search query system 107 in communication with an offline search index management system 109.

The group-based communication platform 105 may generally be a collection of computing services that are accessible to one or more client devices 101A-101N, and that are operable to provide access to a plurality of software applications related to operations of databases. In some embodiments, the group-based communication platform is a channel-based messaging platform. In some examples, the group-based communication platform 105 may take the form of one or more central servers disposed in communication with one or more additional servers running software applications, and having access to one or more databases storing digital content items, application-related data, and/or the like. The group-based communication platform 105 may also support client retention settings and other compliance aspects. Further, the group-based communication platform 105 may provide comprehensive third party developer support that grants appropriate access to the data and allows third parties to build applications and bots to integrate with customer's workflows.

Communications network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 103 may include a cellular telephone, an 802.11, 802.16, 802.20, and/or WiMAX network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a WebSocket channel. In some embodiments, the protocol is JSON over RPC, JSON over REST/HTTP, and the like.

The online search query system 107 may be embodied as a computer or computers. The online search query system 107 may provide for receiving of search queries from various sources, including but not necessarily limited to the client devices 101A-101N, for requesting a subset of a group-based communication data corpus stored in a database 109a of the offline search index management system 109. The group-based communication data corpus, in some embodiments, may be a collection of group-based communication data objects that is generated by dividing a collection of group-based communication data objects into multiple groups. The group-based communication data corpus may be capable of being transmitted, received, and/or stored in a group-based communication platform.

Upon receiving a search query from the client devices 101A-101N, the online search query system 107 may be configured to interact with an offline search index management system 109 to perform search functions in the database 109a to retrieve group-based communication data objects. The online search query system 107 is further configured to generate and transmit a search results interface comprising the retrieved group-based communication data objects to the client devices 101A-101N in response to the search query.

In some embodiments, the online search query system 107 comprises a network database 107a. In some embodiments, the network database 107a may be an electronic repository used to store a collection of information, data, datasets, data objects, or data corpora that is organized and easily accessible for rapid search and retrieval. The network database 107a may provide data storage areas for storing search term attributes, such as maximum term frequency-inverse document frequency (tf-idf) scores, search term lengths, or a matched document number associated with a particular search term, that can be used by a machine learning model for generating a query search result probability associated with the particular search term.

In some embodiments, term frequency-inverse document frequency (tf-idf) score may be a programmatically generated value that is proportional to a number of times a search term appears in group-based communication data objects and may be offset by the total number of the group-based communication data objects. A higher tf-idf score represents the search term has higher importance or higher weights to the group-based communication data objects.

In some embodiments, the online search query system 107 may optionally comprise a search query classifier 107b. The search query classifier 107b may be embodied as a computer or computers. The search query classifier 107b may be a computing entity within an online search query system that is configured to determine whether to conduct a search function by utilizing multi-tiered search index fields tier-by-tier or in parallel in response to a search query. The search query classifier 107b may provide for receiving a search query from client devices 101A-101N, retrieving search term attributes from the network database 107a for conducting machine learning algorithms, and generating a query search result probability based on the machine learning algorithms for determining whether there is a high probability or low probability to query a low retrieval probability corpus stored in the database 109a of the offline search index management system 109 in response to the search query.

The offline search index management system 109 may be embodied as a computer or computers. In general, the offline search index management system 109 may be a platform and associated hardware that is configured to manage multi-tier search index fields based on dividing group-based communication data objects stored in a database 109a into a high retrieval probability corpus or a lower retrieval probability corpus. The offline search index management system 109 may interact with the online search query system 107 allowing a rapid search to be performed for retrieving group-based communication data objects stored in the database 109a based on the multi-tier search index fields. The offline search index management system 109 may provide for indexing data stored in databases or repositories of the group-based communication platform 105. In embodiments, the offline search index management system 109 may be further configured to receive search queries from the online search query system 107, the search queries requesting retrieval of a subset of the group-based communication data corpus stored in the database 109a of the offline search index management system 109.

In some embodiments, the offline search index management system 109 comprises the database 109a and a search index classifier 109b. The database 109a may provide data storage areas for storing group-based communication data object attributes, such as message lengths, the tf-idf scores, historical group message search rates, historical channel message search rates, historical user message search rates, historical user-channel message search rates, user types, message ages, activity notifications, message formats, message types, reply counts, or message sources, etc., associated with group-based communication data objects stored in the database. Those attributes can be used by a machine learning model for generating a retrieval score associated with each group-based communication data object stored in the database 109a. The search index classifier 109b may be embodied as a computer or computers.

Further, the search index classifier 109b may be configured to index group-based communication data objects stored in database 109a. In general, the search index classifier 109b may be a computing entity within the offline search index management system 109 that is configured to assign group-based communication data objects to a high retrieval probability corpus or a lower retrieval probability corpus based on each group-based communication data object's retrieval score. The search index classifier uses machine learning models or other similar techniques to generate a respective retrieval score for each group-based communication data object based on attributes such as message lengths, historical search rates, user types, etc., that are stored in the database 109a.

The search index classifier 109b may provide for retrieving group-based communication data objects stored in the database 109a, generating a retrieval score for each group-based communication data object, assigning each group-based communication data object to a high retrieval probability corpus or a lower retrieval probability corpus, and generating a high retrieval probability index to be associated with the high retrieval probability corpus and a low retrieval probability index to be associated with the low retrieval probability corpus.

In some embodiments, the index or index file may be a data structure that improves database system response time when queried with data retrieval operations. For example, indexes allow database systems to quickly locate data without having to search every row in a database table every time it is accessed. The index may accept data from many different sources, including, for example, XML files, comma-separated value (CSV) files, data extracted from tables in a database, and files in common file formats such as Microsoft® Word and Adobe® PDF. These data may contain multiple fields, each with a name and containing content, which may be empty. In addition, the index (for example, search index) may be generated after performing analysis or tokenization of the data to be indexed, for example, by removing pluralization, tense, or character casing, so that a searcher need not remember the exact form of a search term in order to retrieve a query. Further, a shard may store its partition of data in index files (for example, search indexes). In some embodiments, a search index data structure improves search functionalities in response to a search query with a request for retrieving group-based communication data objects stored in the database 109a. In embodiments, a search index may be used to classify group-based communication data objects as a group of high retrieval probability corpus or a group of low retrieval probability corpus for conducting a tier-by-tier search of the database in order. By conducting a multi-tier search index fields retrieval operation, a search result interface may be generated using less responding time while still providing a sufficient number of search results.

In some embodiments, a tiered search index fields may be a multi-tier search index data structure for operating search functions in response to a search query to retrieve group-based communication data objects stored on the database 109a. The tiered search index fields may be used to divide group-based communication data objects that are stored on the database 109a into multiple tiers, each tier forms a corresponding group-based communication data corpus comprising a corresponding subset of the group-based communication data objects. Upon receiving a search query, a server in the group-based communication platform 105 may search the first tier of the corresponding group-based communication data corpus to retrieve a number of group-based communication data objects forming into first search results. If the first search results fail to meet a threshold number of group-based communication data objects, the server in the group-based communication platform may further search the second tier of the corresponding group-based communication corpus to retrieve more group-based communication data objects, thereby adding into second search results into the first search results, and so on.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication platform 105 via a web browser. As yet another example, the client device 101A-101N may include various hardware or firmware designed to interface with the group-based communication platform 105.

In some embodiment, the user may access the system 100 and set up a user account comprising a user profile, a user account, and user account details. The user may set up a username and password for accessing the account. Any other identification information may be used such as, for example, social security number, date of birth, biometric information, and any other personal information associated with the account such as a user identifier. The user profile may include one or more group-based communication channel identifiers associated with group-based communication channels to which the user has been granted access, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The group identifier may comprise ASCII text, a pointer, a memory address, and the like and may identify a group within the group-based communication system. The user account details can include a subset designation of user credentials, such as, for example, login information for the user including the user's username and password. For example, the user type may be a member, a non-member, an administrator, a third party application or resource, or a bot.

In some embodiments, user profile objects are embodied as electronic data objects associated with a particular user's personal information and specifically executable and/or otherwise accessible via the group-based communication platform 105 by the user via a client device of the client devices 101A-101N.

The group-based communication platform 105 may generally provide a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, a common set of group-based messaging communications may be displayed to each member of the respective group-based communication channel such that the content of the group-based communication channel (i.e., messaging communications) will not vary per member of the group-based communication channel. The group may be defined by common access credentials such as those of an organization or commercial enterprise. Access may further be facilitated by a validated request to join or an invitation to join transmitted by one group member user to another non-member user.

In some embodiments the group-based communication channel may be private. The private group-based communication channel may have restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

A group operating on the group-based communication platform 105 may be identified by a group identifier or a team identifier as described above. For example, a group identifier may comprise ASCII text, a pointer, a memory address, and the like. Further, group-based communication system users may be organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

In some embodiments, group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile as described above. The group-based communication channel identifier may be used to facilitate access control for a message. The group-based communication channel identifier may be used to determine context for the message as described above.

In some embodiments, the group-based communication data object may be a set of digitally generated interrelated data representing a data object capable of being transmitted, received, and/or stored on the group-based communication platform 105. In some embodiments, the group-based communication data object is stored on the database 109*a*. The group-based communication data objects may take many forms, including as work objects, as group-based communication message objects, as user profile objects, as channel profile objects, as group profile objects, and/or the like. In certain embodiments, the group-based communication data object may be in the form of a work object embodied as a message. In such embodiments, the group-based communication data object features of the message may include a message length, a user type of the user created the message, a message age (network time period from a creation timestamp associated with a time when a message is created to a timestamp associated with receipt of a search query and stored in the database 109*a*), an activity notification related to the message, a message format, a message type, a reply count to the message, a message source, or various message metadata.

In some embodiments, the activity notification may be a programmatically generated value representing a total number of interactions associated with a particular user and a particular message. Exemplary interactions may comprise a reply, a reaction, a starring, a sharing, and the like. In some embodiments, the reply count may be a programmatically generated value that represents a total number of replies to a particular message. In some embodiments, the message source may be a group-based communication data object feature representing a source repository within which a message may be stored.

In certain embodiments, work objects may be embodied as electronic data objects specifically executable and/or otherwise accessible via the group-based communication platform 105 and/or client devices 101A-101N. Work objects may be received at the group-based communication platform 105 by receiving those work objects conveyed to (pushed to) the group-based communication platform 105, or the group-based communication platform 105 may retrieve (pull to) various work objects stored within network database such as network database 107*a* or other databases such as database 109*a* of the group-based communication platform 105. The work objects may convey human-readable representations of information and/or computer-executable content that causes a particular client device of the client devices 101A-101N to operate in a particular way. In certain embodiments, work objects may be embodied as messages, emails, events, audio files, video files, document files, spreadsheet files, presentation files, tasks, and/or the like; as well as any contextual data corresponding therewith. Work objects may thus be non-personal (alternatively referred to as public) as they are exchanged between a plurality of users or otherwise made available to a plurality of users. Alternatively, work objects may be personal in nature (e.g., as defined by a portion of metadata associated with the work object), such that access to the content of the work object is limited to a single user (or a limited number of defined users). For example, work objects personal to a single user may encompass tasks or task lists defined personally by and for a particular user. Access to personal work objects may be limited to access requests associated with defined user identifiers. In certain embodiments, personal work objects may be represented as encrypted data when indexed in database storage areas and/or when included within work graph data structures including personal and non-personal work objects.

Channel profile objects may be embodied as electronic data objects associated with a particular group-based communication channel and specifically executable and/or otherwise accessible via the group-based communication platform by the users associated with the particular group-based communication channel via the client devices 101A-101N. Similarly, group profile objects may be embodied as electronic data objects associated with a particular group/team and specifically executable and/or otherwise accessible via the group-based communication platform by the users associated with the particular group/team via client devices 101A-101N.

In some embodiments, a query may be a "select query," which is used to extract data from the database in a readable format according to the query. A query may be an "action query," which asks for operations (such as insertion, deletion, and/or updating) on the data stored in a network database or a database. A query may be a "search query," or a "search query request," which is received from a client device associated with a particular user requesting for operating a search function on the database 109a to retrieve a subset of a group-based communication data corpus stored in the database 109a.

In some embodiments the retrieval score may be a programmatically generated value associated with a group-based communication data object. The programmatically generated value represents a programmatically generated likelihood (discussed below) that the group-based communication data object will appear in search results responsive to the search query requested by the user using a client device of the client devices 101A-101N. For example, the retrieval score may be proportional to the programmatically generated likelihood (discussed below). In such an example, a higher retrieval score is created for the group-based communication data object associated with a higher programmatically generated likelihood of retrieval.

In some embodiments, the retrieval score threshold may be a programmatically generated or predefined value that is used to determine whether a group-based communication data object is associated with a high likelihood or a low likelihood of appearing in search results. If the retrieval score of the group-based communication data object is higher than the retrieval score threshold, the group-based communication data object will be determined to be highly likely to appear in search results. On the contrary, if the retrieval score of a group-based communication data object is lower than the retrieval score threshold, the group-based communication data object will be determined to be less likely to appear in search results.

In some embodiments, the programmatically generated likelihood may be a programmatically generated value representing a measure of probability associated with a particular occurrence. A programmatically generated likelihood may be computed using a machine learning model based on attributes associated with a group-based communication data object, including a message length, the term frequency-inverse document frequency (tf-idf) score, a historical group message search rate, a historical channel message search rate, a historical user message search rate, a historical user-channel message search rate, a user type, a message age, an activity notification, a message format, a message type, a reply count, a message source, and so on. For example, a larger message length or a higher maximum tf-idf score may have a larger programmatically generated likelihood, because more information content in the message is available that may match a search term. As another example, a higher historical group message search rate, historical channel message search rate, historical user message search rate, or historical user-channel message search rate may have a larger programmatically generated likelihood, because the message has a higher frequency of appearing in search results based on the search history statistics.

A machine learning model is a computer-implemented algorithm that can learn from data without relying on rules-based programming. These models enable reliable, repeatable decisions and results and uncovering of hidden insights through machine-based learning from historical relationships and trends in the data. In some embodiments, the machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network).

In some embodiments, retrieval-recency search results interface may be an application interface to be rendered by a client device of the client devices 101A-101N operated by the user in response to a search term input by the user. The retrieval-recency search results interface comprises a group-based communication data object subset, where each group-based communication data object of the group-based communication data object subset having at least one group-based communication data object feature matching the search term. The retrieval-recency search results are rendered in order based on retrieval scores and recency scores of each group-based communication data object within the group-based communication data object subset.

In some embodiments, the relevancy score may be a programmatically generated value that is associated with a group-based communication data object, the relevancy score generated and based in part on a search term, the programmatically generated value representing a likelihood that the group-based communication data object associated with one or more group-based communication data object features matches a search term input by a particular user via a client device of the client devices 101A-101N. If a first group-based communication data object has more group-based communication data object features matching the search term comparing to a second group-based communication data object, a higher relevancy score may be generated indicating the first group-based communication data object is highly relevant to the search term. On the contrary, if the first group-based communication data object has fewer group-based communication data object features matching the search term comparing to a second group-based communication data object, a lower relevancy score may be generated indicating the first group-based communication data object is less relevant to the search term.

In certain embodiments, the retrieval-relevancy search results interface may be an application interface transmittable and renderable by a client device operated by a particular user in response to a search term input by the particular user. The retrieval-relevancy search results interface comprises a group-based communication data object subset, where each group-based communication data object of the group-based communication data object subset comprises at least one group-based communication data object feature matching the search term. The retrieval-relevancy search results are rendered in order based on retrieval scores and relevancy scores of each group-based communication data object within the group-based communication data object subset.

In some embodiments, the retrieval-recency search results interface may be an application interface to be rendered by a client device of the client devices 101A-101N operated by the user in response to a search term input by the user. The retrieval-recency search results interface comprises a group-based communication data object subset, where each group-based communication data object of the group-based communication data object subset having at least one group-based communication data object feature matching the search term. The retrieval-recency search results are rendered in order based on retrieval scores and recency scores of each group-based communication data object within the group-based communication data object subset.

In certain embodiments, the recency score may be a programmatically generated value that is associated with a group-based communication data object and a search query, the programmatically generated value representing how recently the respective group-based communication data object is created in view of the search query receiving time. For example, if a group-based communication data object is associated with a higher recency score, the group-based communication data object is created more recently in view of the search query receiving time. Alternatively, if a group-based communication data object is associated with a lower recency score, the group-based communication data object is created awhile in view of the search query receiving time.

In some embodiments, the search results may be a subset of a group-based communication data corpus that is generated in response to a search query received from a client device of the client devices 101A-101N. The search results may comprise a group-based communication data object subset that includes group-based communication data objects associated with group-based communication data object features matching a search term within the search query.

In certain embodiments, a high retrieval probability corpus may be a collection of group-based communication data objects having a high likelihood of appearing in search results responding to a search query, where each group-based communication data object within the collection has a retrieval score higher than a retrieval score threshold. Alternatively, the low retrieval probability corpus may be a collection of group-based communication data objects having a low likelihood of appearing in search results responding to a search query, where each group-based communication data object within the collection has a retrieval score lower than a retrieval score threshold.

In some embodiments, a high retrieval probability search index field may be a data structure associated with a high retrieval probability corpus for quickly locating and retrieving group-based communication data objects stored within the high retrieval probability corpus. Alternatively, a low retrieval probability search index field may be a data structure associated with a low retrieval probability corpus for quickly locating and retrieving group-based communication data objects stored within the low retrieval probability corpus.

In some embodiments, the search term may be search criteria configured by the user using a client device of the client devices 101A-101N by way of inputting a sentence, word, phrase, name, emoji, or other text entry into the client device. The search term may comprise a keyword, a character, a number, or their combination that is set by the particular user for retrieving search results in response to the search term.

In certain embodiments, a query search result probability threshold may be a programmatically generated or predefined value that is used to determine whether there is high likelihood or low likelihood of querying a low retrieval probability corpus in response to a search term. If the query search result probability of a search term is higher than the query search result probability threshold, the search term will be determined to be highly likely to result in a query of the low retrieval probability corpus. On the contrary, if the query search result probability of a search term is lower than the query search result probability threshold, the search term will be determined to be less likely to result in a query of the low retrieval probability corpus.

In some embodiments, the query search result probability may be a programmatically generated value representing a measure of probability of querying a low retrieval probability corpus in response to a search term. The query search result probability may be computed using the machine learning model based on attributes associated with the search term, including the maximum term frequency-inverse document frequency (tf-idf) score, the search term length, a matched document number associated with the search term, and so on. For example, a lower maximum tf-idf score may have a larger query search result probability, since there are fewer group-based communication data objects matching the search term and thus, querying a low retrieval probability corpus may be required. For another example, a larger search term length may have a smaller programmatically generated likelihood, since the search term has more information content for allowing group-based communication data objects to be matched and thus, querying a low retrieval probability corpus is not required.

In some embodiments, the search results interface may be an application interface transmittable and renderable by a client device of the client devices 101A-101N operated by a particular user in response to a search term transmitted to the group based communication platform 105 by the client device. The search results interface comprises a group-based communication data object subset, where each group-based communication data object of the group-based communication data object subset is associated with group-based communication data object features matching the search term. In embodiments, the search results are rendered in the search results interface in an order based on retrieval scores of each group-based communication data object within the group-based communication data object subset (i.e., ranked according to respective retrieval scores).

In some embodiments, a search result threshold may be a programmatically generated threshold value that is used to determine whether a search query is to move to the next tier of search index field for rendering additional group-based communication data objects in search results. If a total number of group-based communication data objects in search results of a current tier search index field is smaller than the search result threshold, the group-based communication system may determine to execute an additional search in the next tier search index field to retrieve additional group-based communication data objects to be rendered in search results.

In embodiments, if the query search result probability is higher than a threshold value, a search function utilizing the multi-tiered search index fields is operated tier-by-tier, since there is a high probability that utilizing the first few tiers of search index fields to retrieve group-based communication data objects will have sufficient search results (i.e., the number of group-based communication data objects retrieved in search results exceeding or meeting certain search result threshold). In embodiments, if the query search result probability is below a threshold value, a search function utilizing the multi-tiered search index fields is operated in parallel (i.e., conduct the search function for every tier of search index in parallel), since there is a low probability that utilizing the first few tiers of search index fields to retrieve group-based communication data objects will have sufficient search results (i.e., the number of group-based communication data objects retrieved in search results fails to meet certain search result threshold).

In some embodiments, a historical group message search rate may be a programmatically generated value that is associated with a total number of times a message (i.e., a group-based communication data object that is in the form of a work object embodied as a message) from a particular group (i.e., organization, team, workspace, and the like) appears in a search results interface within a pre-defined period of network time. Similarly, a historical channel message search rate may be a programmatically generated value that is associated with a total number of times a message from a particular group-based communication channel appears in a search results interface within a pre-defined period of network time. Similarly, a historical user message search rate refers to a programmatically generated value that is associated with a total number of times a message associated with a particular user appears in a search results interface within a pre-defined period of network time. Similarly, a historical user-channel message search rate may be a programmatically generated value that is associated with a total number of times a message associated with a particular user and a particular group-based communication channel appears in a search results interface within a pre-defined period of network time.

Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: the sending user identifier, the message_identifier, message contents, the group identifier, and the group-based communication channel identifier. Each of the foregoing identifiers may comprise ASCII text, a pointer, a memory address, and the like as described above.

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
   <timestamp>2020-12-31 23:59:59</timestamp>
   <user_accounts_details>
      <user_account_credentials>
         <user_name>ID_user_1</user_name>
      <password>abc123</password>
      //OPTIONAL <cookie>cookieID</cookie>
      //OPTIONAL
<digital   cert   link>www.mydigitalcertificate.com/
   JohnDoeDaDoeDoe@gmail.com/mycertifcate.dc</
   digital_cer t_link>
   //OPTIONAL
<digital_certificate>_DATA_</digital_certificate>
   </user_account_credentials>
</user_accounts_details>
<client_details>//iOS Client with App and Webkit
//it should be noted that although several client details
//sections are provided to show example variants of client
//sources, further messages will include only on to save
//space
   <client_IP>10.0.0.123</client_IP>
   <user_agent_string>Mozilla/5.0 (iPhone; CPU iPhone
      OS 7_1_1 like Mac OS X) AppleWebKit/537.51.2
      (KHTML, like Gecko) Version/7.0 Mobile/11D201
      Safari/9537.53</user_agent_string>
<client_product_type>iPhone6,1</client_product_ty pe>
<client_serial_number>DNXXX1X1XXXX</client_se-
   rial_number>
<client_UDID>3XXXXXXXXXXXXXXXXXXXXX
   XXD</client_U DID>
   <client_OS>iOS</client_OS>
   <client_OS_version>7.1.1</client_OS_version>
   <client_app_type>app with webkit</client_app_type>
<app_installed_flag>true</app_installed_flag>
   <app_name>MSM.app</app_name>
   <app_version>1.0</app_version>
   <app_webkit_name>Mobile
Safari</app_webkit_name>
   <client_version>537.51.2</client_version>
</client_details>
<client_details>//iOS Client with Web browser
   <client_IP>10.0.0.123</client_IP>
   <user_agent_string>Mozilla/5.0 (iPhone; CPU iPhone
      OS 7_1_1 like Mac OS X) AppleWebKit/537.51.2
      (KHTML, like Gecko) Version/7.0 Mobile/11D201
      Safari/9537.53</user_agent_string>
<client_product_type>iPhone6,1</client_product_ty pe>
<client_serial_number>DNXXX1X1XXXX</client_se-
   rial_number>
<client_UDID>3XXXXXXXXXXXXXXXXXXXXX
   XXD</client_U DID>
   <client_OS>iOS</client_OS>
   <client_OS_version>7.1.1</client_OS_version>
   <client_app_type>web
browser</client_app_type>
   <client_name>Mobile Safari</client_name>
   <client_version>9537.53</client_version>
</client_details>
<client_details>//Android Client with Web browser
```

```
<client_IP>10.0.0.123</client_IP>
<user_agent_string>Mozilla/5.0 (Linux; U; Android
    4.0.4; en-us; Nexus S Build/IMM76D) AppleWeb-
    Kit/534.30 (KHTML, like Gecko) Version/4.0
    Mobile Safari/534.30</user_agent_string>
<client_product_type>Nexus S</client_product_type>
<client_serial_number>YXXXXXXXXZ</client_serial_number>
    <client_UDID>FXXXXXXXXX-XXXX-XXXX-
        XXXX-XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details>//Mac Desktop with Web browser
    <client_IP>10.0.0.123</client_IP>
    <user_agent_string>Mozilla/5.0 (Macintosh; Intel Mac
        OS X 10_9_3) AppleWebKit/537.75.14 (KHTML,
        like Gecko) Version/7.0.3 Safari/537.75.14</user_agent_string>
<client_product_type>MacPro5,1</client_product_type>
<client_serial_number>YXXXXXXXXZ</client_serial_number>
    <client_UDID>FXXXXXXXXX-XXXX-XXXX-
        XXXX-XXXXXXXXXXXXX</client_UDID>
    <client_OS>Mac OS X</client_OS>
<client_OS_version>10.9.3</client_OS_version>
    <client_app_type>web browser</client_app_type>
    <client_name>Mobile Safari</client_name>
    <client_version>537.75.14</client_version>
</client_details>
<message>
<message_identifier>ID_message_10</message_identifier>
    <team_identifier>ID_team_1</team_identifier>
<channel_identifier>ID_channel_1</channel_identifier>
    <contents>That is an interesting disclosure. I have
        attached a copy our patent_policy.</contents>
    <attachments>patent_policy.pdf</attachments>
</message>
</auth_request>
```

The group-based communication platform 105 comprises at least one group-based communication server 106 that may create a storage message based upon the received message to facilitate message storage in one or more databases. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server may provide the following example storage message, substantially in the form of a HTTP(S) POST message including XML-formatted data, as provided below:

```
POST/storage message.php HTTP/1.1
Host: www.server.com
Content-Type: Application/XML
Content-Length: 667
<?XML version="1.0" encoding="UTF-8"?>
<storage message>
<message_identifier>ID_message_10</message_identifier>
    <team_identifier>ID_team_1</team_identifier>
    <channel_identifier>ID_channel_1</channel_identifier>
    <sending user identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure.
    I have attached a copy our patent policy.</contents>
    <attachments>patent_policy.pdf</attachments>
    <conversation_primitive>
        conversation includes messages:
        ID_message_8, ID_message_9, ID_message_10,
            ID_message_11, ID_message_12
    </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using PHP commands) to determine a sending user identifier of the user who sent the message. The sending user identifier may be associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

In some embodiments, the group-based communication system users may be organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). The group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message 10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, message UIs, such as attachments, may be included with the message. If there are attachments, files may be associated with the message. In one implementation, the message may be parsed (e.g., using PHP commands) to determine file names of the attachments. For example, file contents may be analyzed to determine context for the message (e.g., a patent_policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In some embodiments, various metadata, determined as described above, and/or the contents of the message may be used to index the message (e.g., using the conversation primitive) to facilitate various facets of searching (i.e., search queries that return results from group-based communication repository). In one implementation, a storage message may be sent from group-based communication server 106 to the database 109a of the offline search index management system 109 for indexing by the search index classifier 109b. In another implementation, metadata associated with the message may be determined and the message may be indexed in database 109a. In one embodiment, the message may be indexed such that a company's or a group's messages are indexed separately (e.g., in a separate index associated with the group and/or company that is not shared with other groups and/or companies). In one implementation, messages may be indexed at a separate distributed repository that may be retrieved by the search index classifier 109b (e.g., to facilitate data isolation for security purposes).

If there are attachments associated with the message, file contents of the associated files may be used to index such files in group-based communication repository to facilitate searching. In some embodiments, the files may be indexed such that a company's or a group's files are indexed at a separate distributed repository.

Figure 2:
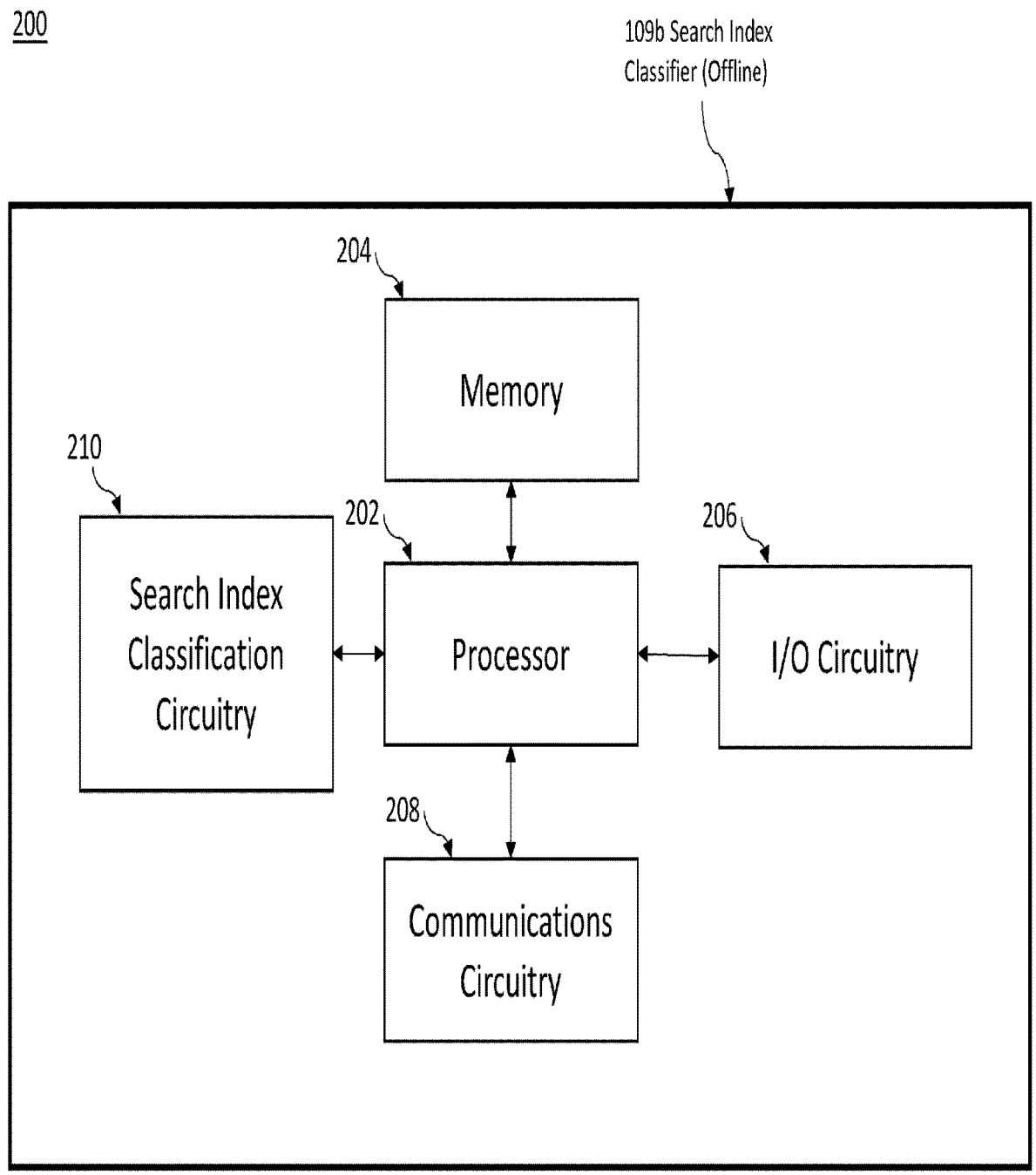
FIG. 2 depicts an example search index classifier schematic diagram in accordance with some embodiments of the present disclosure.

FIG. 2 illustrates an exemplary schematic diagram 200 of the search index classifier 109b that may be embodied by one or more computing systems. The search index classifier 109b may include a processor 202, a memory 204, input/output circuitry 206, communications circuitry 208, and search index classification circuitry 210. The search index classifier 109b may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

In some embodiments, the circuitry can be understood broadly to include hardware and, in some embodiments, software for configuring the hardware. For example, in some embodiments, "circuitry" may include processing circuitry, storage media, network interfaces, input/output devices, and the like. In some embodiments, other elements of the search index classifier 109b may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the search index classifier 109b may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the search index classifier 109b. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The search index classification circuitry 210 includes hardware configured to support a group-based communication system. The search index classification circuitry 210 may utilize processing circuitry, such as the processor 202, to perform these actions. The search index classification circuitry 210 may send and/or receive data from online search query system 107. In some implementations, the sent and/or received data may be search queries used to retrieve group-based communication data objects stored in the database 109a of the offline search index management system 109 via tiered indices search operation. The search index classification circuitry 210 is configured to assign group-based communication data objects stored in the database 109a to a high retrieval probability corpus and a low retrieval probability corpus. The search index classification circuitry 210 is configured to associate a high retrieval search index to each group-based communication data object of the high retrieval probability corpus and associate a low retrieval search index to each group-based communication data object of the low retrieval probability corpus.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
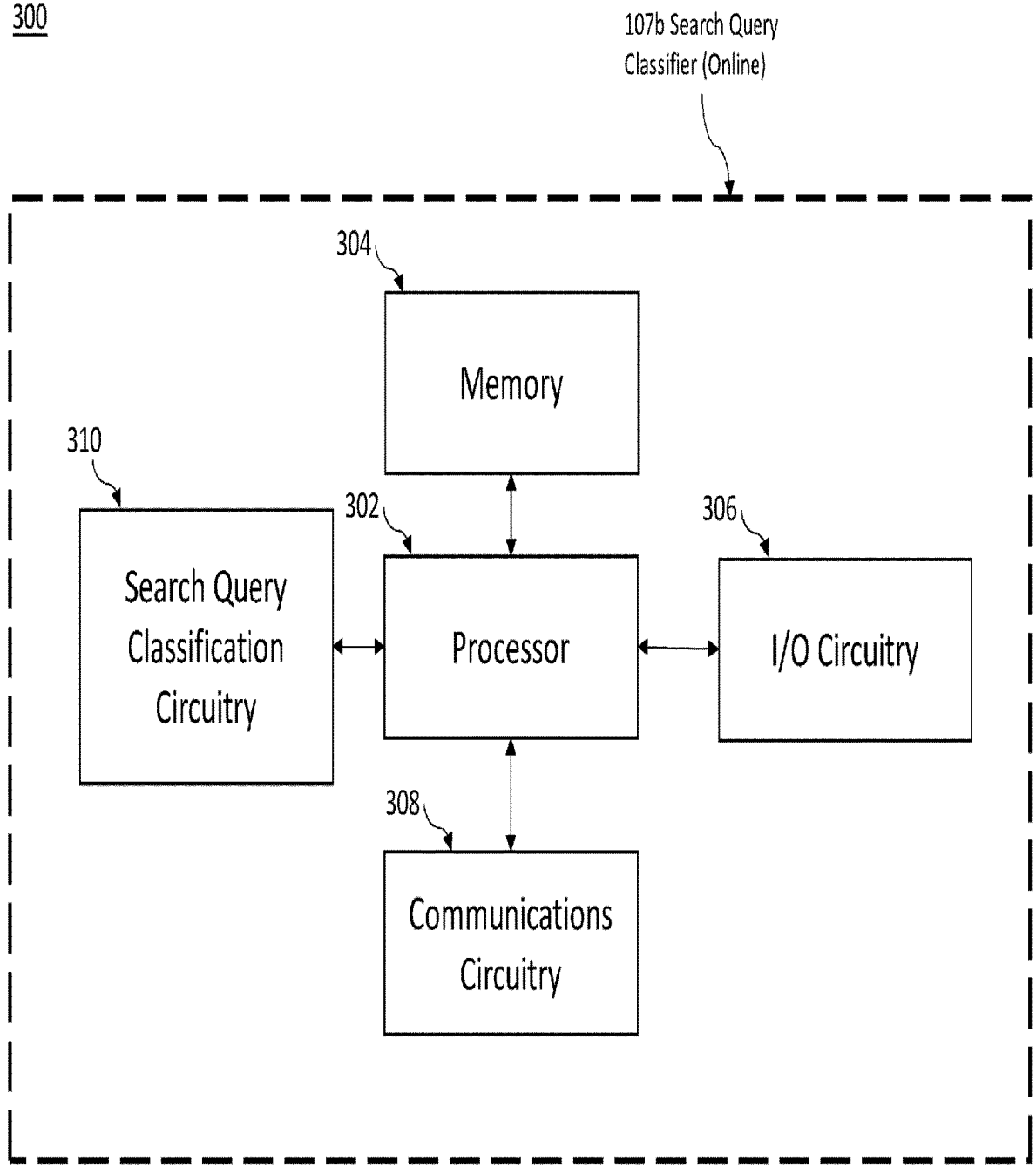
FIG. 3 depicts an example search query classifier schematic diagram in accordance with some embodiments of the present disclosure.
Figure 5:
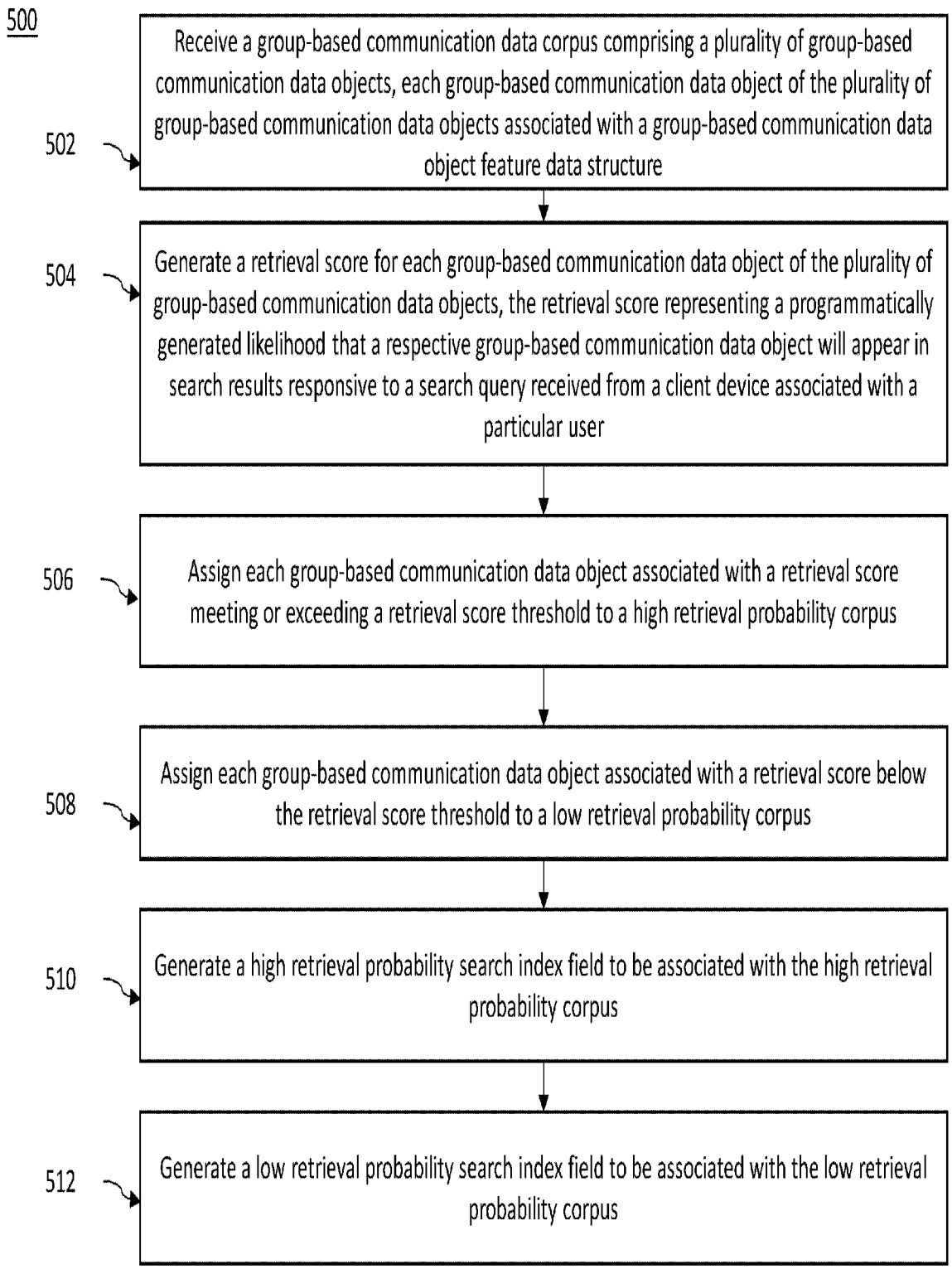

FIG. 3 illustrates an exemplary schematic diagram 300 of the optional search query classifier 107b that may be embodied by one or more computing systems. The search query classifier 107b may include a processor 302, a memory 304, input/output circuitry 306, communications circuitry 308, and search query classification circuitry 310. The search query classifier 107b may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

In some embodiments, "circuitry" can be understood broadly to include hardware and, in some embodiments, software for configuring the hardware. For example, in some embodiments, "circuitry" may include processing circuitry, storage media, network interfaces, input/output devices, and the like. In some embodiments, other elements of the search query classifier 107b may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the search query classifier 107b may include input/output circuitry 306 that may, in turn, be in communication with processor 302 to provide output to the user and, in some embodiments, to receive an indication of a user input. The input/output circuitry 306 may comprise a user interface and may include a display and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 308 may be any means such as a device or circuitry embodied in either hardware or a combination of hardware and software that is configured to receive and/or transmit data from/to a network and/or any other device, circuitry, or module in communication with the search query classifier 107b. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The search query classification circuitry 310 includes hardware configured to support a group-based communication system. The search query classification circuitry 310 may utilize processing circuitry, such as the processor 302, to perform these actions. The search query classification circuitry 310 may send and/or receive data from client devices and offline search index management system 109. In some implementations, the sent and/or received data may be search queries received from client devices and to be transmitted to the offline search index management system 109 for retrieving group-based communication data objects stored in the database of the offline search index management system 109 via tiered indices search operations. The search query classification circuitry 310 is configured to determine whether to query the high retrieval probability corpus and the low retrieval probability corpus in parallel or not. The search query classification circuitry 310 is further configured to retrieve a subset of a group-based communication data corpus, for rendering a search results interface, by querying the high retrieval probability corpus, the low retrieval probability corpus, or both.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Generating Tiered Search Indices Based on a Divided Group-Based Communication Data Corpus in a Group-Based Communication Platform FIG. 4A is an example flow chart illustrating an example method for generating tiered search index fields based on retrieval scores, in accordance with some embodiments of the present disclosure. The example processes may be implemented in an offline phase. In the offline phase, search index classifier 109b may retrieve a group-based communication corpus comprising group-based communication data objects (shown as Data Object 1- Data Object N in FIG. 4A) stored in the database 109a and generate a retrieval score for each group-based communication data object (shown as Retrieval Score 1- Retrieval Score N in FIG. 4A). In the embodiments, the retrieval score is generated by a machine learning model that is trained by attributes associated with the group-based communication data objects, such as a message length, a tf-idf score, a search rate, a user type, a message age, etc. The search index classifier 109b may compare each retrieval score to a retrieval score threshold so as to assign each group-based communication data object to a high retrieval probability corpus or a low retrieval probability corpus. In the embodiments, the search index classifier 109b may associate each group-based communication data object of the high retrieval probability corpus with a high retrieval search index field and associate each group-based communication data object of the low retrieval probability corpus with a low retrieval search index field.

FIG. 4B is an example flow chart illustrating an example method for generating search results interfaces in response to search queries, in accordance with some embodiments of the present disclosure.

In the online phase, the group-based communication platform 105 may receive a search query from a client device 101 via a communications network 103. The group-based communication platform 105 may query the high retrieval probability corpus to generate a first group-based communication data object subset for rendering within a first search results interface. In the meantime, the group-based communication platform 105 may query the high retrieval probability corpus and the low retrieval probability corpus in parallel to generate a combined group-based communication data object subset for rendering within a combined search results interface. In such an embodiment, the group-based communication platform 105 may determine, based on comparing a total number of group-based communication data objects appearing in the first search results interface with a search result threshold, to transmit the first search results interface or the combined search results interface back to the client device 101. If the total number of group-based communication data objects appearing in the first search results interface exceeds or meets the search result threshold, the first search results interface is transmitted to the client device 101. If the total number of group-based communication data objects appearing in the first search results interface is below the search result threshold, the combined search results interface is transmitted to the client device 101.

FIG. 4C is an example flow chart illustrating an example method for generating search results interfaces based on the search query classifier 107*b* in response to search queries, in accordance with some embodiments of the present disclosure.

In the online phase, the search query classifier 107*b* may receive a search query from a client device 101 via a communications network 103. The search query classifier 107*b* may further generate a query search result probability using a machine learning model that is trained by attributes associated with the search term of the search query, such as a maximum tf-idf score, a search term length, a matched document number associated with the search term, etc. The generated query search result probability may be used to, by comparing to a query search result threshold, determine whether to query the high retrieval probability corpus and the low retrieval search corpus in parallel or not.

In circumstances where the query search result probability is determined to be smaller than the query search result threshold, the search query classifier 107*b* may first query the high retrieval probability corpus to generate first group-based communication data object subset for rendering within a first search results interface. If the total number of the group-based communication data objects appearing in the first search results interface is lower than a search result threshold, the search query classifier 107*b* may further query the low retrieval probability corpus for retrieving additional group-based communication data objects to be added to the first group-based communication data object subset for rendering in a second search results interface.

In circumstances where the query search result probability is determined to be larger than the query search result threshold, the search query classifier 107*b* may query the high retrieval probability corpus and the low retrieval search corpus in parallel so as to generate a group-based communication data object subset for rendering within a combined search results interface.

Figure 6A:
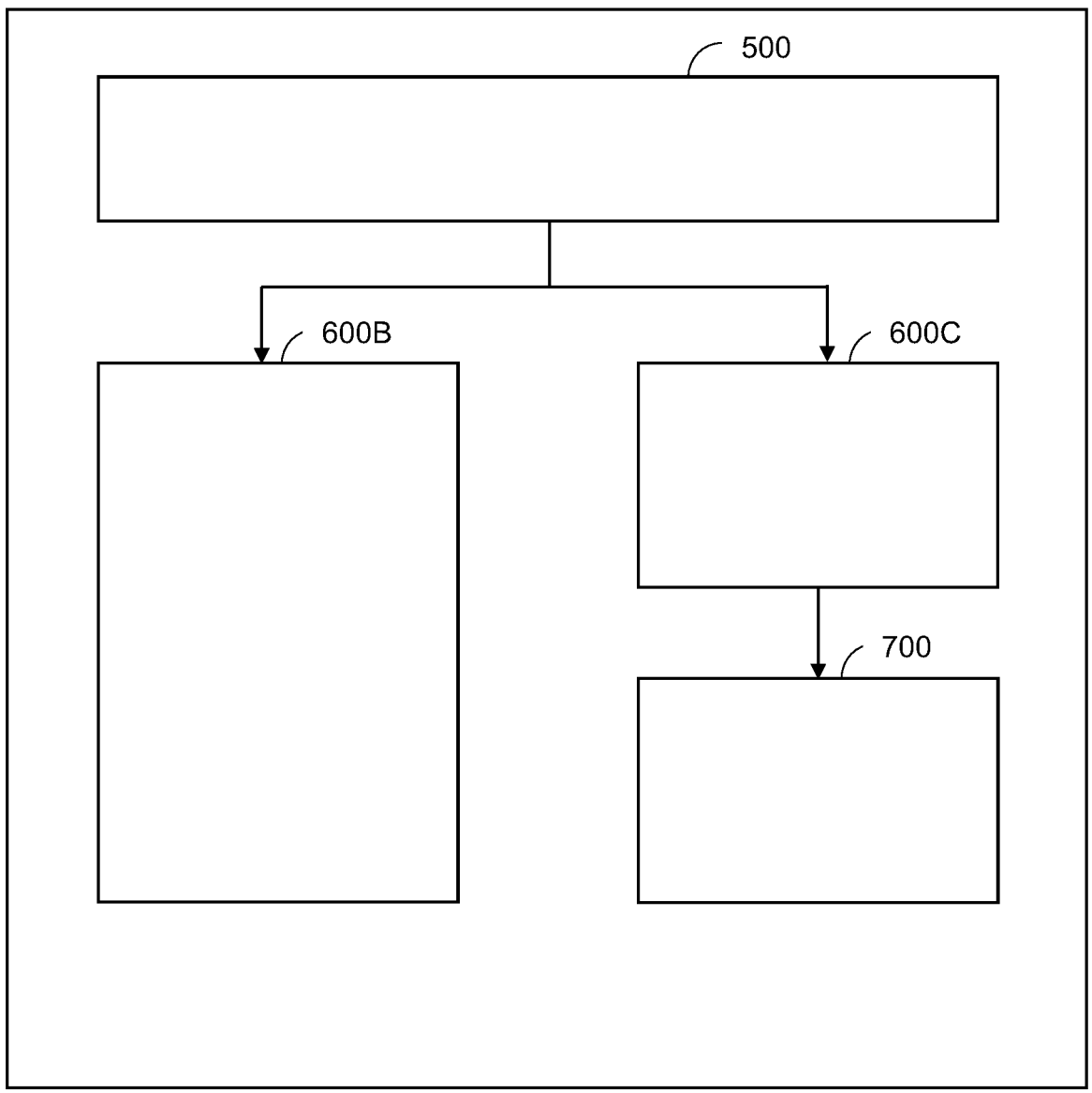
Figure 6B:
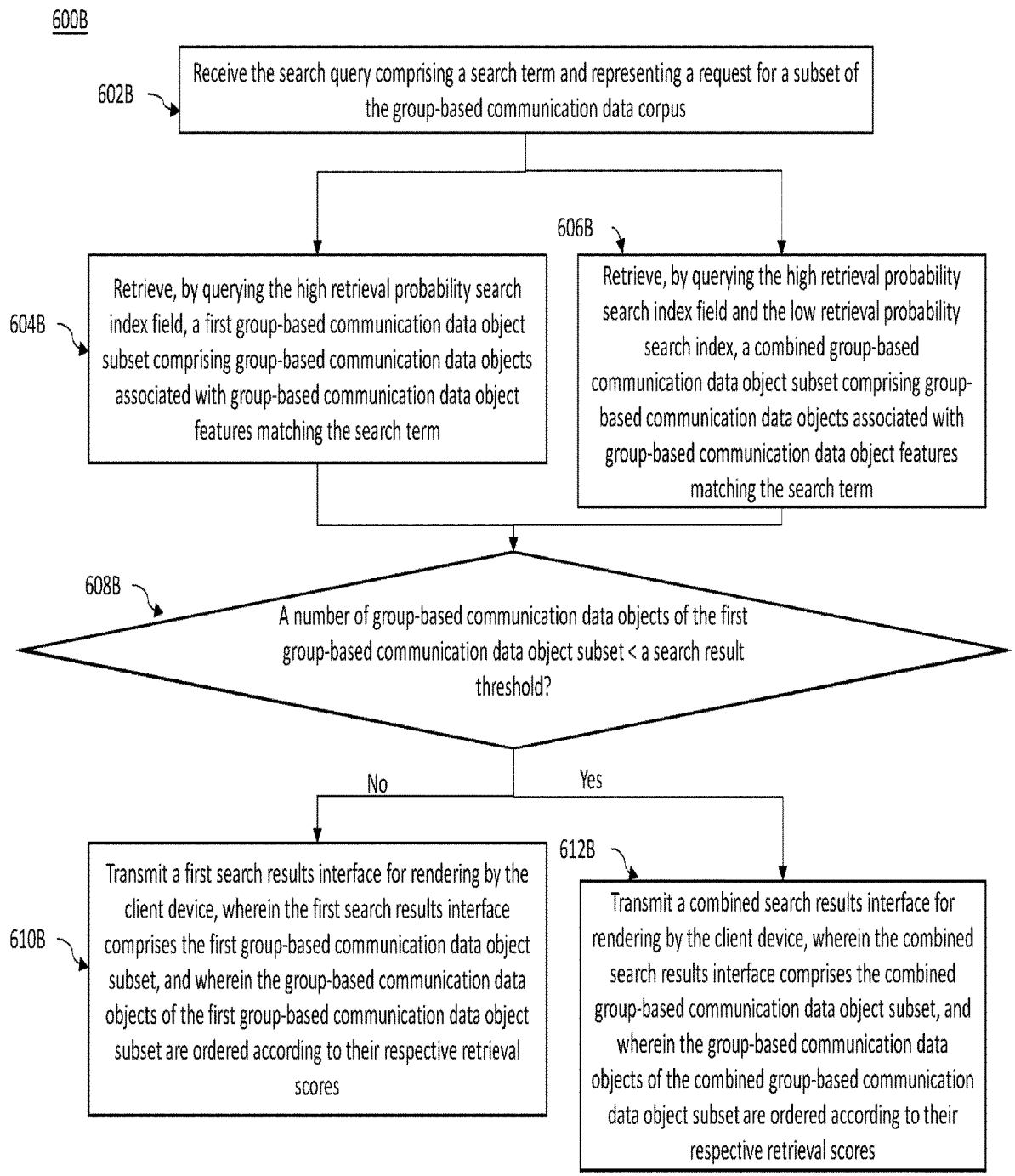

FIGS. 5, 6B, 6C, and 7 (laid out as illustrated in FIG. 6A) are example flow charts illustrating example methods for generating tiered search index fields and rendering a search results interface that is ordered according to retrieval scores in accordance with some embodiments of the present disclosure.

At operation 502, a method 500 begins with receiving a group-based communication data corpus comprising a plurality of group-based communication data objects. Each group-based communication data object of the plurality of group-based communication data objects is associated with a group-based communication data object feature data structure.

At operation 504, the method 500 continues with generating a retrieval score for each group-based communication data object of the plurality of group-based communication data objects. The retrieval score represents a programmatically generated likelihood that a respective group-based communication data object will appear in search results responsive to a search query received from a client device associated with a particular user.

At operation 506, the method 500 continues with assigning each group-based communication data object that is associated with a retrieval score meeting or exceeding a retrieval score threshold to a high retrieval probability corpus.

At operation 508, the method 500 continues with assigning each group-based communication data object that is associated with a retrieval score below the retrieval score threshold to a low retrieval probability corpus.

At operation 510, the method 500 continues with generating a high retrieval probability search index field to be associated with the high retrieval probability corpus.

At operation 512, the method 500 continues with generating a low retrieval probability search index field to be associated with the low retrieval probability corpus.

Once tiered search index fields are generated based on the method 500, a search results interface for rendering by a client device may be generated based on a method 600B or another method 600C, as illustrated in FIG. 6A.

At operation 602B, the method 600B starts with receiving the search query comprising a search term. The search query represents a request for a subset of the group-based communication data corpus.

At operation 604B, the method 600B continues with retrieving, by querying the high retrieval probability search index field, a first group-based communication data object subset. The first group-based communication data object subset comprises group-based communication data objects that are associated with group-based communication data object features matching the search term.

At operation 606B, the method 600B continues with retrieving, by querying the high retrieval probability search index field and the low retrieval probability search index, a combined group-based communication data object subset. The combined group-based communication data object subset comprises group-based communication data objects that are associated with group-based communication data object features matching the search term.

At operation 608B, the method 600B continues with determining whether a number of group-based communication data objects of the first group-based communication data object set is below a search result threshold.

In circumstances where the number of group-based communication data objects of the first group-based communication data object set exceeds or meets the search result threshold, at operation 610B, the method 600B continues with transmitting a first search results interface for rendering by the client device, wherein the first search results interface comprises the first group-based communication data object subset, and wherein the group-based communication data objects of the first group-based communication data object subset are ordered according to their respective retrieval scores.

In circumstances where the number of group-based communication data objects of the first group-based communication data object set is below the search result threshold, at operation 612B, the method 600B continues with transmitting a combined search results interface for rendering by the client device, wherein the combined search results interface comprises the combined group-based communication data object subset, and wherein the group-based communication data objects of the combined group-based communication data object subset are ordered according to their respective retrieval scores.

In another embodiments a search results interface for rendering by a client device may be generated based on a method 600C utilizing the search query classifier 107b. At operation 602C, the method 600C starts with receiving the search query comprising a search term. The search query represents a request for a subset of the group-based communication data corpus.

At operation 604C, the method 600C continues with generating a search result probability based on the search term. The search result probability is generated for determining whether to query the low retrieval probability search index field.

At operation 606C, the method 600C continues with determining whether a search query probability is lower than a query search result probability threshold.

In circumstances where the search query probability is determined to be lower than the query search result probability threshold, at operation 608C, the method 600C continues with retrieving, by querying the high retrieval probability search index field, a first group-based communication data object subset comprising group-based communication data objects that are associated with group-based communication data object features matching the search term.

At operation 610C, the method 600C continues with transmitting a first search results interface for rendering by the client device. The first search result interface comprises the first group-based communication data object subset, and the group-based communication data objects of the first group-based communication data object subset are ordered according to their respective retrieval scores.

Upon determining that a number of group-based communication data objects of the first group-based communication data objects subset is below a search result threshold, at operation 702 of FIG. 7, the method 600C continues on the diagram 700 with retrieving, by querying the low retrieval probability search index field, a second group-based communication data object subset comprising group-based communication data objects that are associated with group-based communication data object features matching the search term.

Figure 7:
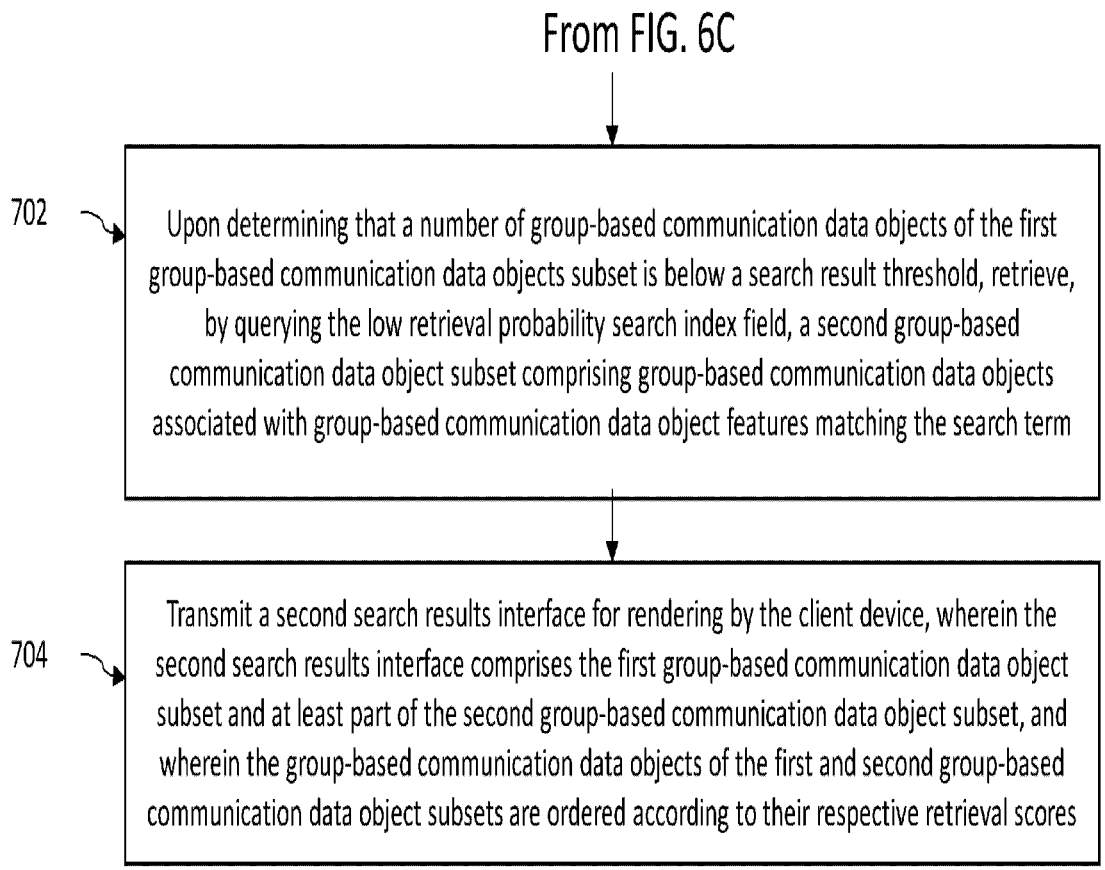
Figure 8:
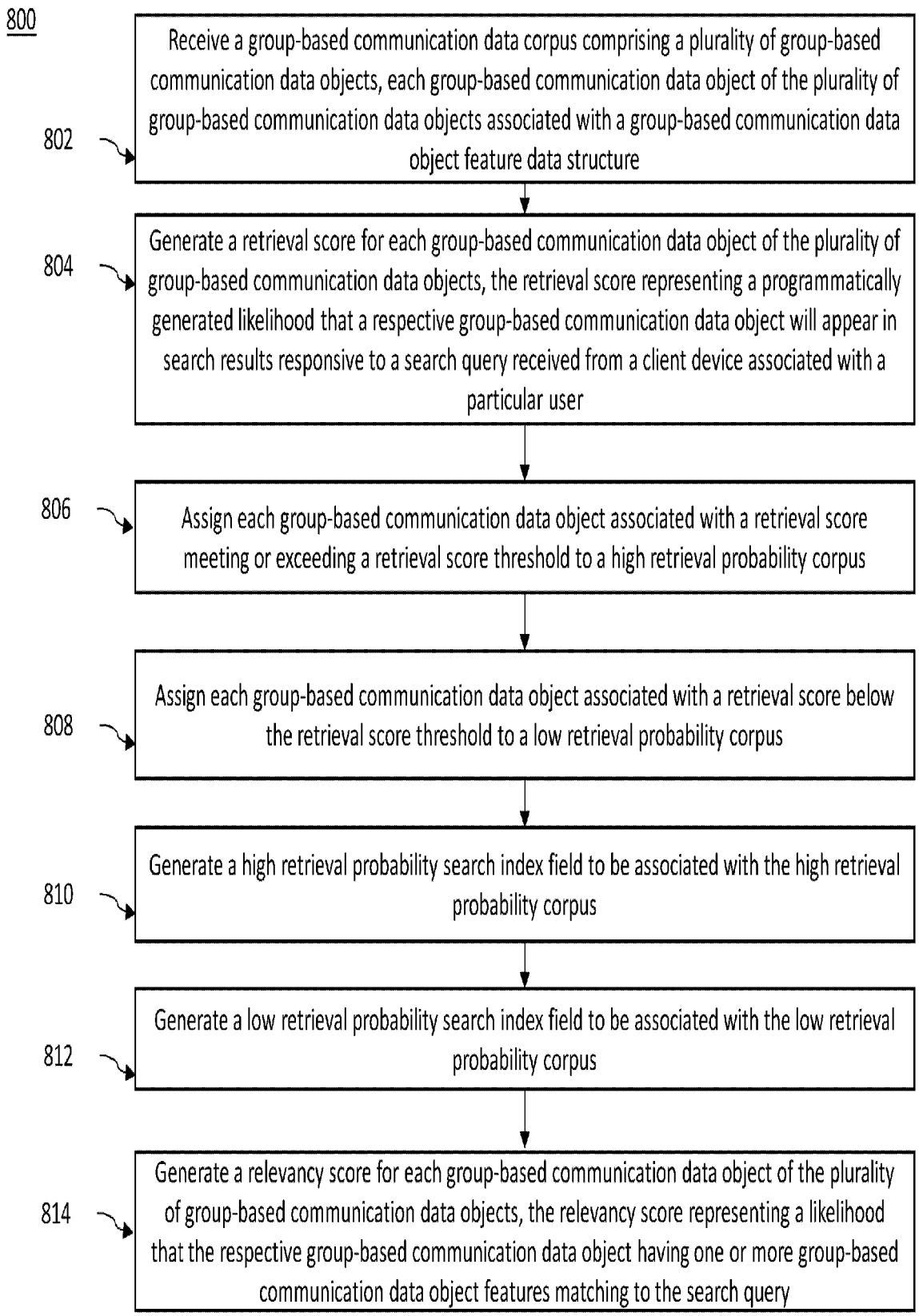

At operation 704 of FIG. 7, the method 600C continues with transmitting a second search results interface for rendering by the client device. The second search results interface comprises the first group-based communication data object subset and at least part of the second group-based communication data object subset, and the group-based communication data objects of the first and second group-based communication data object subsets are ordered according to their respective retrieval scores.

With reference again to FIG. 6C, in circumstances where the search query probability is determined to be higher than the query search result probability threshold, at operation 612C, the method 600C continues with retrieving, by querying the high retrieval probability search index field and the low retrieval probability search index field, a combined group-based communication data object subset comprising group-based communication data objects that are associated with group-based communication data object features matching the search term.

At operation 614C, the method 600C continues with transmitting a combined search results interface for rendering by the client device. The combined search result interface comprises the combined group-based communication data object subset, and the group-based communication data objects of the combined group-based communication data object subset are ordered according to their respective retrieval scores.

Figure 9A:
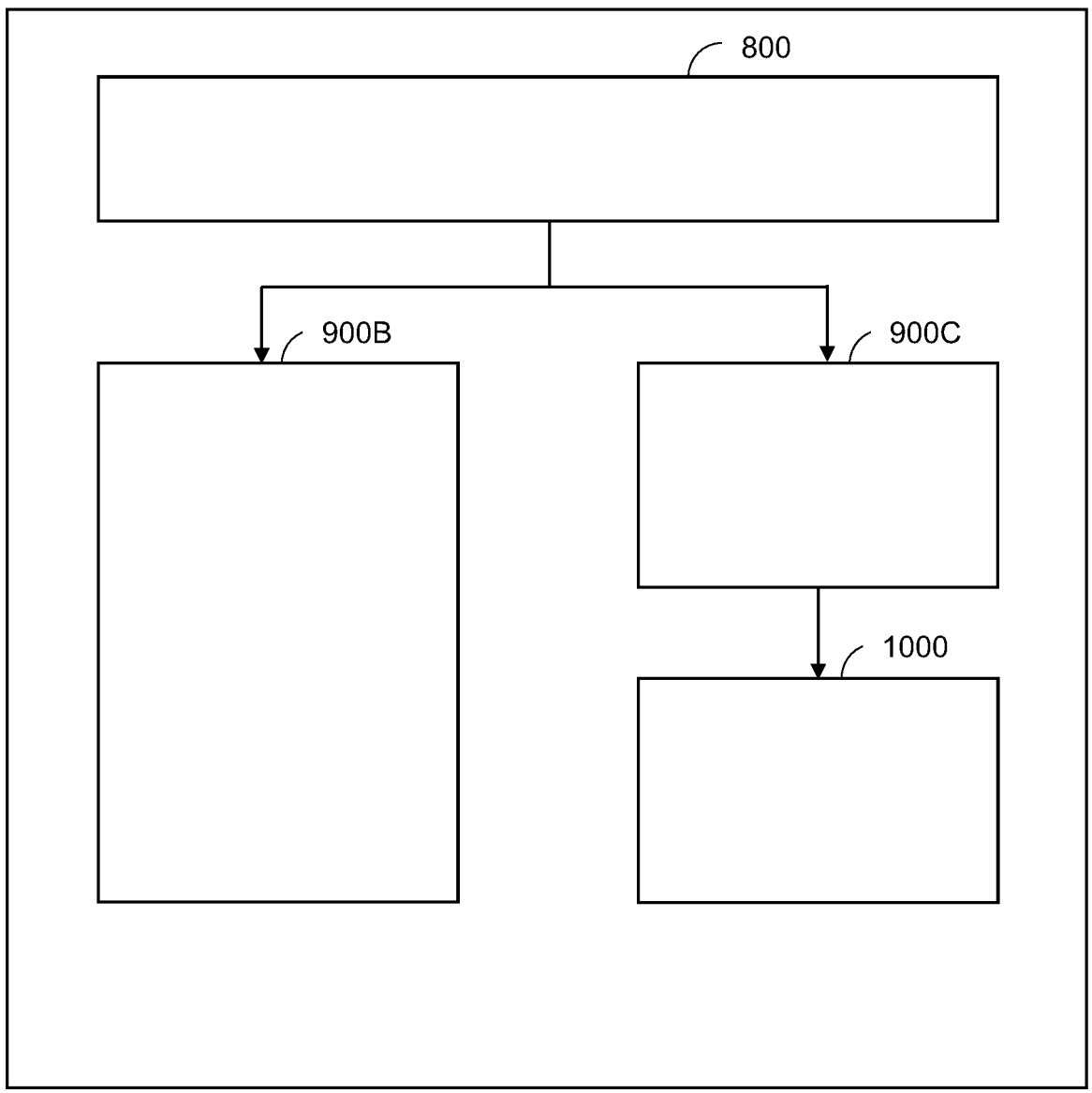
Figure 9B:
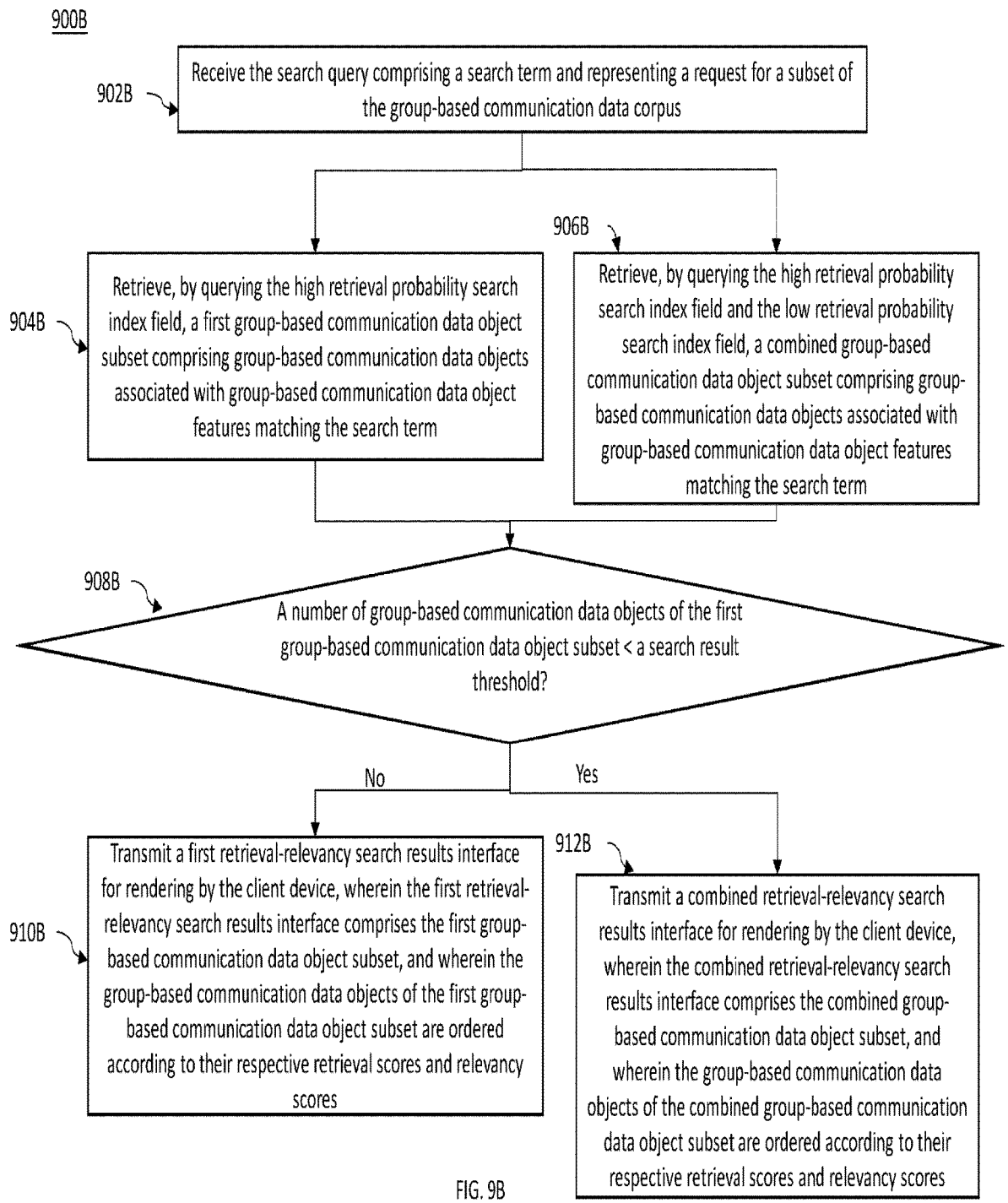
Figure 9C:
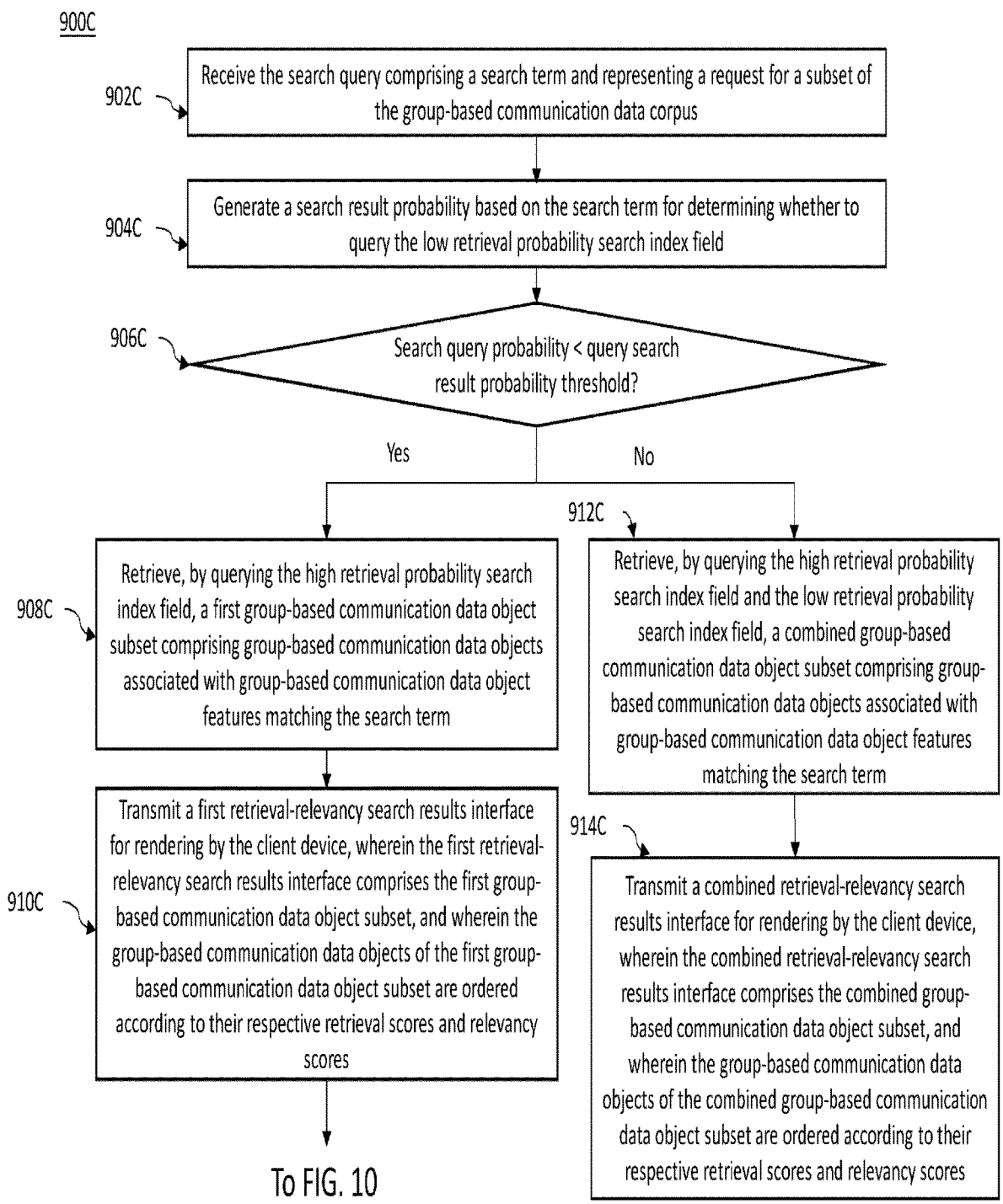
Figure 10:
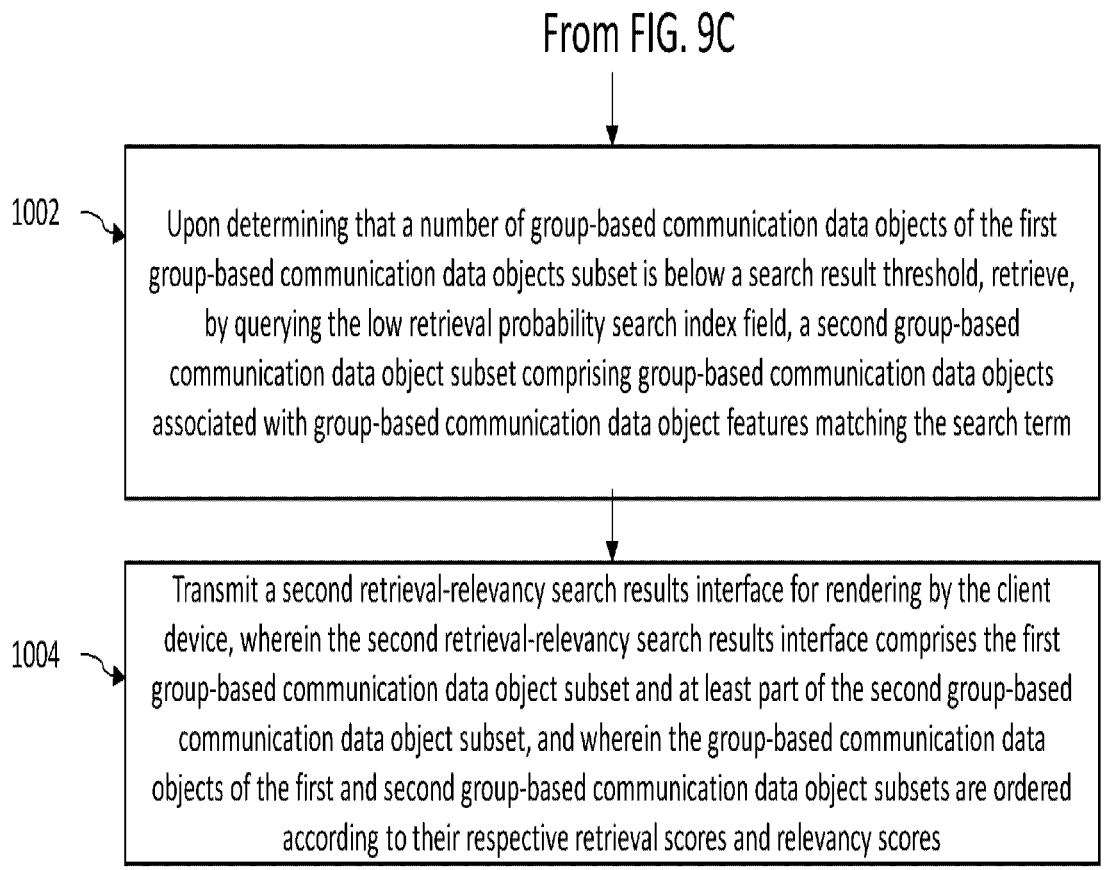
Figure 11:
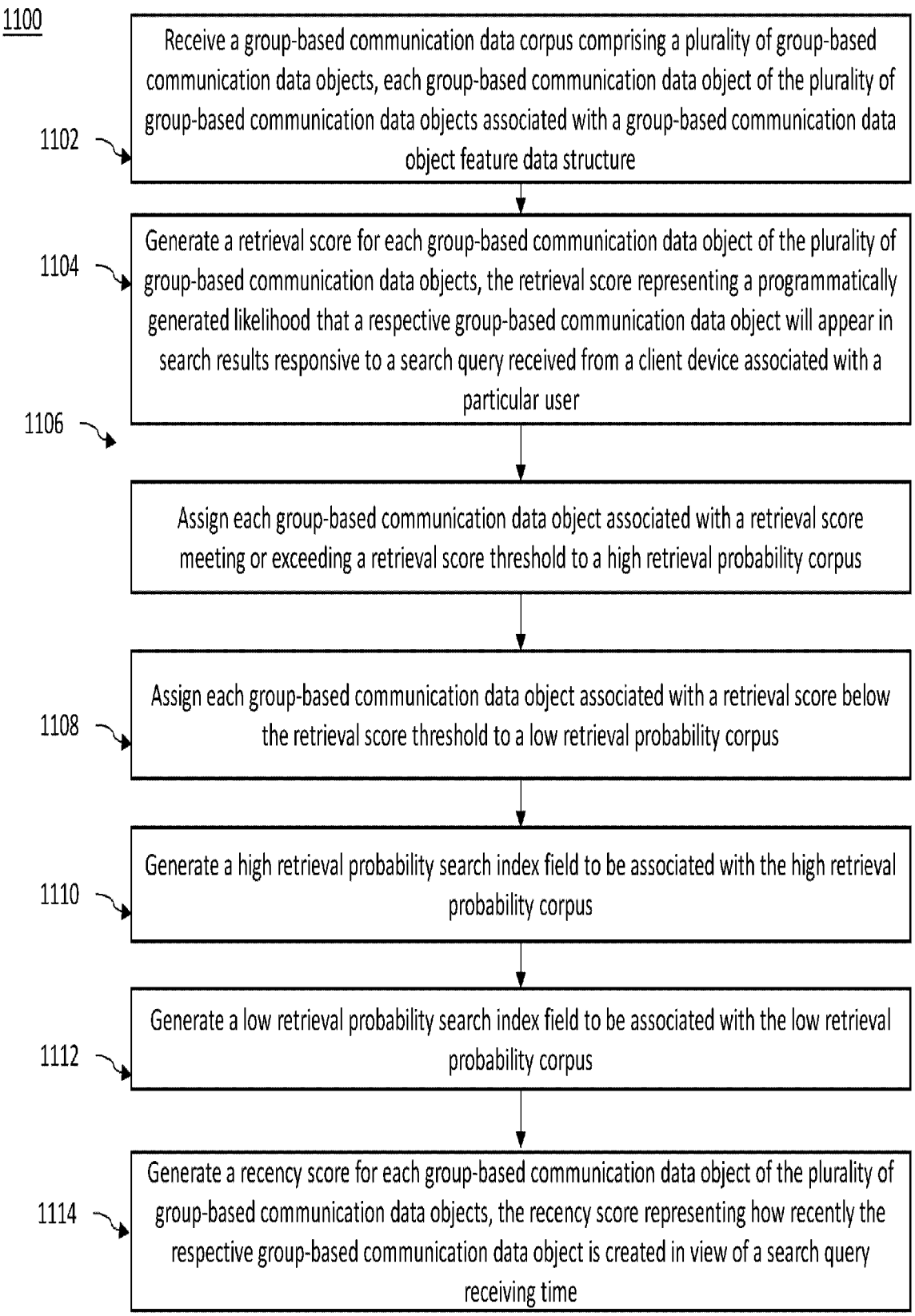

FIGS. 8, 9B, 9C, and 10 (laid out as shown in FIG. 9A) are example flow charts illustrating example methods for generating tiered search index fields and rendering a search results interface that is ordered according to retrieval scores and relevancy scores, in accordance with some embodiments of the present disclosure.

While distinct, the methods 800, 900B, 900C, and 1000 (as illustrated in FIG. 9A) comprise similar steps to the methods 500, 600C, 600C, and 700. Therefore, detailed descriptions of similar operations are omitted hereinafter. Steps 802-812, 902B-908B, 902C-908C, and 1002 is omitted from discussion as these steps are discussed in detail above. The method 800 has an additional operation 814 comparing to method 500. At operation 814, the method 800 continues with generating a relevancy score for each group-based communication data object of the plurality of group-based communication data objects. The relevancy score represents a likelihood that the respective group-based communication data object is associated with one or more group-based communication data object features matching the search query. The generated relevancy score may be used to rank and present in a ranked order group-based communication data objects within a first retrieval-relevancy search results interface, a combined retrieval-relevancy search results interface, and a second retrieval-relevancy search results interface at operations 910B, 912B, 910C, 914C, and 1004.

FIGS. 11, 12B, 12C, and 13 (laid out as shown in FIG. 9A) are example flow charts illustrating example methods for generating tiered search index fields and rendering a search results interface that is ordered according to retrieval scores and recency scores, in accordance with some embodiments of the present disclosure.

Figure 12A:
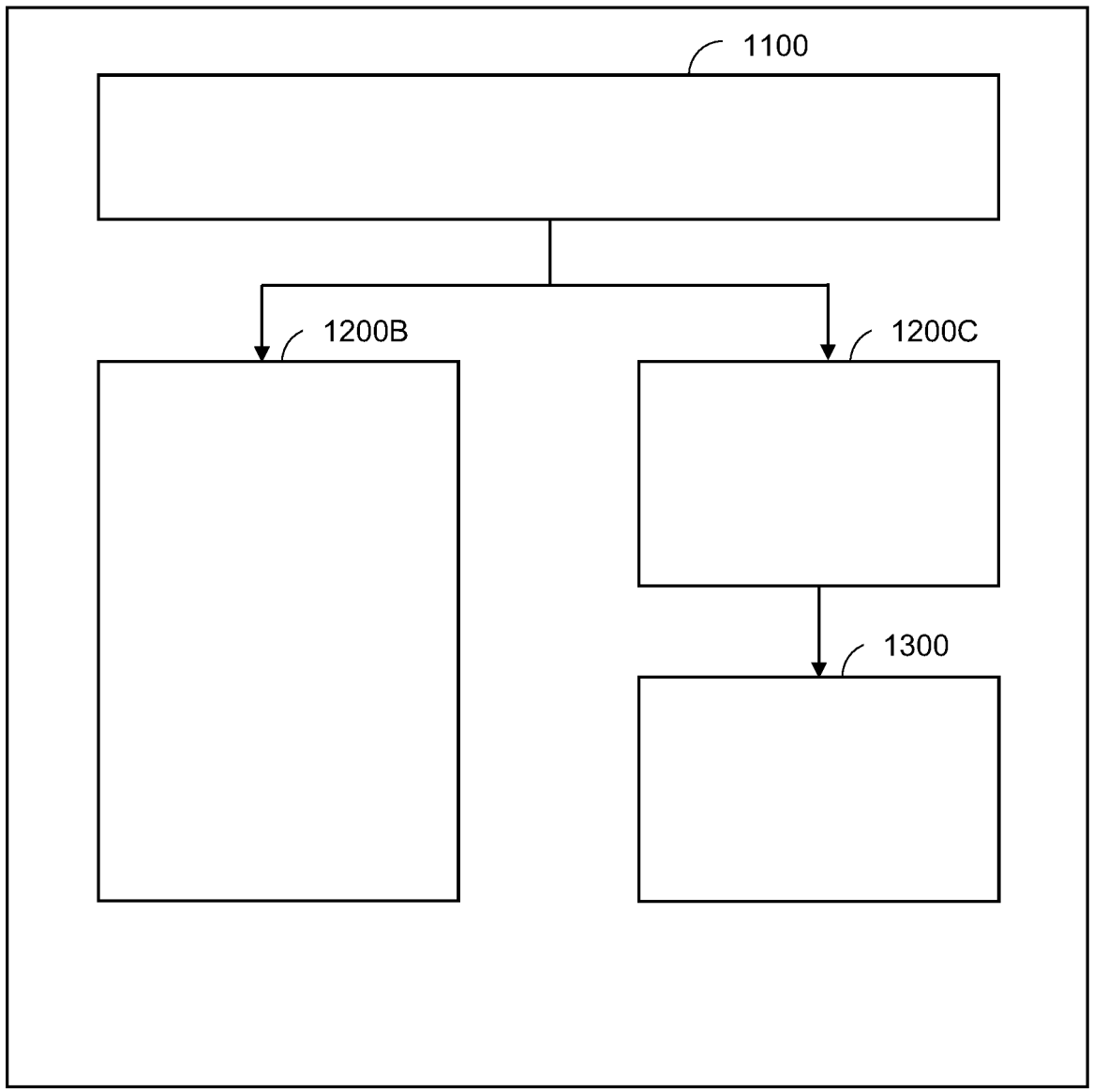
Figure 12B:
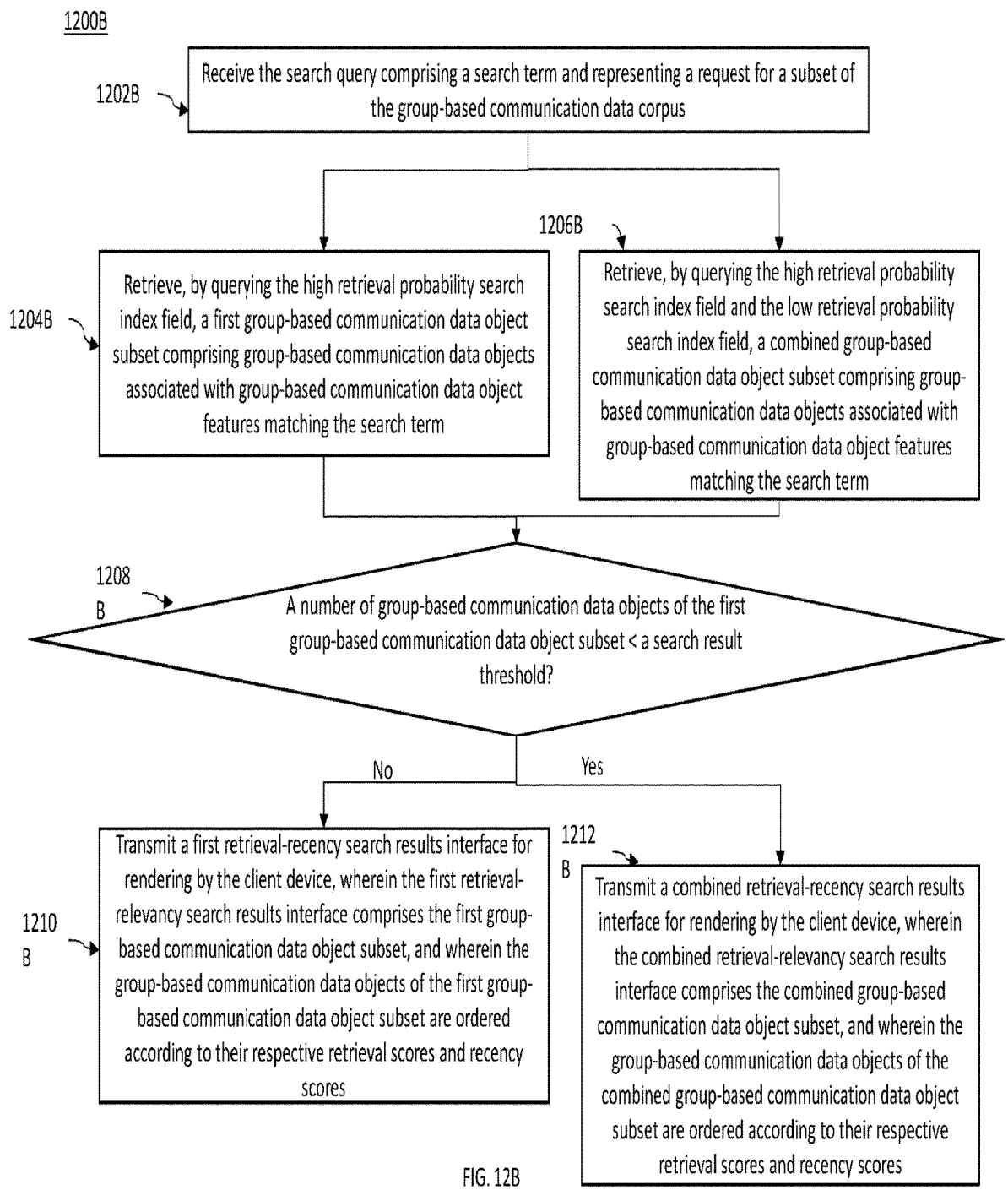
Figure 12C:
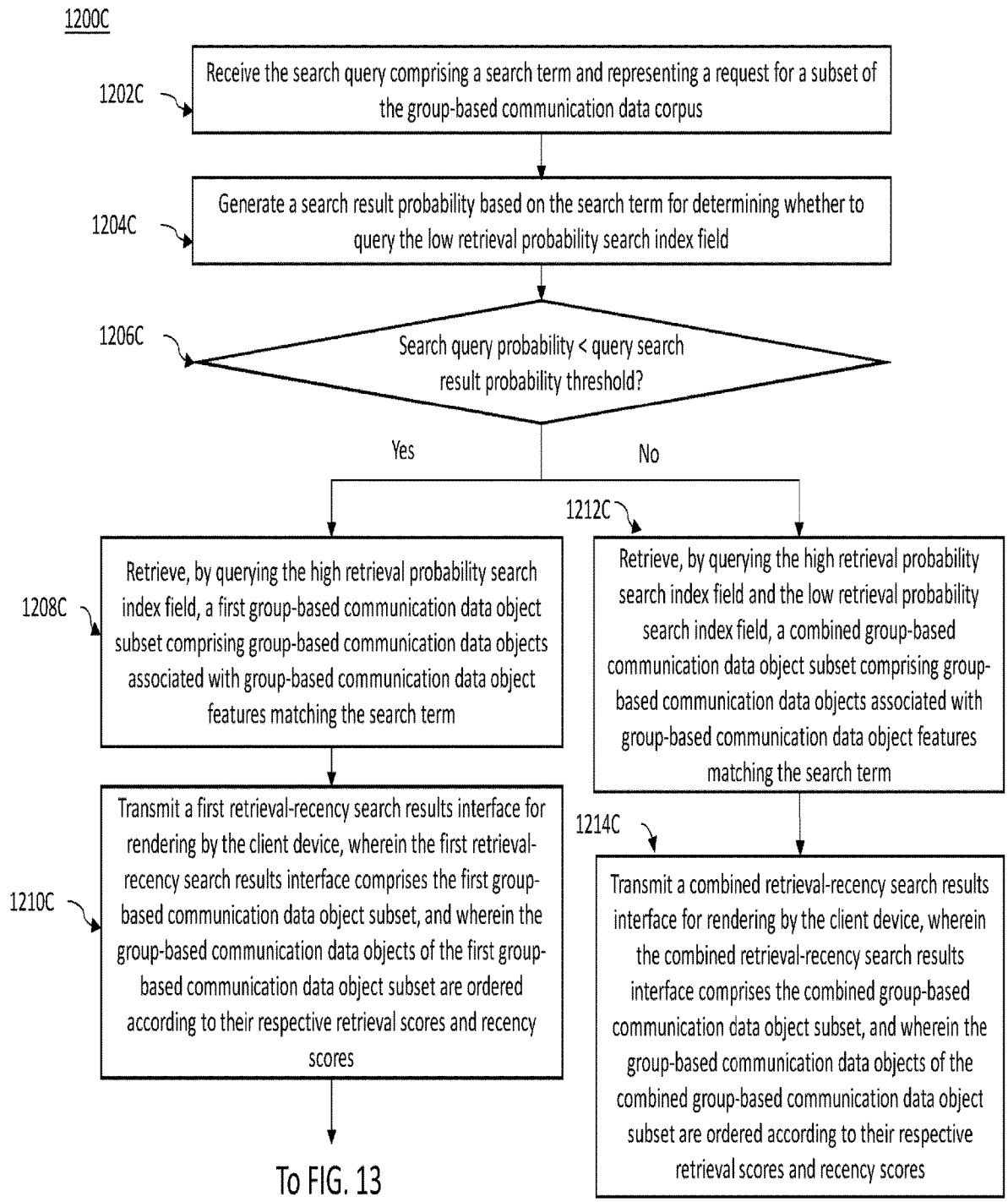
Figure 13:
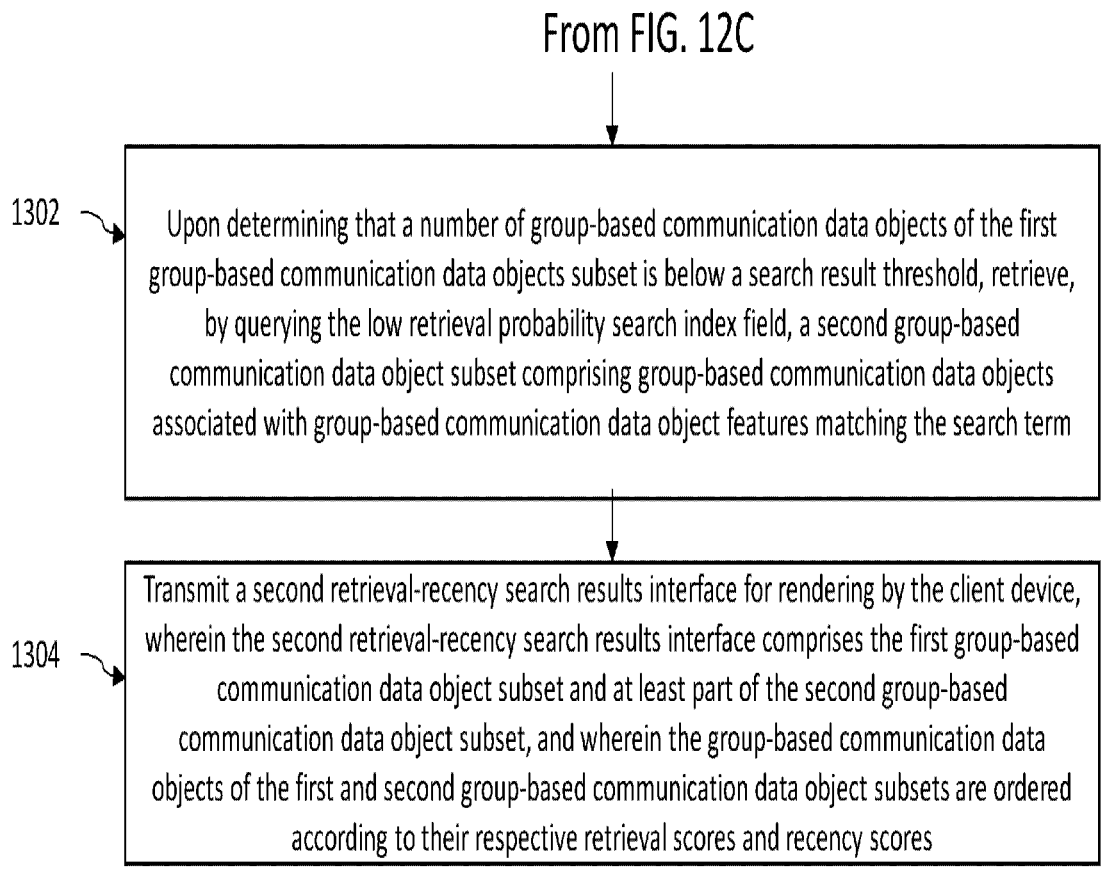

While distinct, the methods 1100, 1200B, 1200C, 1300 (as illustrated in FIG. 12A) are similar to the methods 500, 600B, 600C, and 700. Therefore, detailed descriptions of similar operations are omitted hereinafter. Steps 1102-1112, 1202B-1208B, 1202C-1208C, and 1302 are omitted from the discussion as these steps are described in detail above. The method 1100 comprises an additional operation 1114 comparing to method 500. At operation 1114, the method 1100 continues with generating a recency score for each group-based communication data object of the plurality of group-based communication data objects. The recency score represents how recently the respective group-based communication data object is created in view of a search query receiving time. The generated recency score may be used to rank and present in a ranked order group-based communication data objects a first retrieval-recency search results interface, a combined retrieval-recency search results interface, and a second retrieval-recency search results interface at operations 1210B, 1212B, 1210C, 1214C, and 1304.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

Although the invention has been described with reference to the embodiments illustrated in the attached drawing figures, it is noted that equivalents may be employed and substitutions made herein without departing from the scope of the invention.

Having thus described various embodiments, what is claimed as new and desired to be protected by Letters Patent includes the following:

The invention claimed is:

1. A system for generating tiered search index fields, the system comprising at least one processor and at least one non-transitory memory including computer-executable instructions that, when executed by the at least one processor, performs a method comprising:
   receiving a plurality of data objects from a group-based communication system that supports messages exchanged between one or more users;
   generating a retrieval score for each data objects of the plurality of data objects;
   assigning a first set of data objects of the plurality of data objects associated with a high retrieval score exceeding a retrieval score threshold to a high retrieval probability set;
   assigning a second set of data objects of the plurality of data objects associated with a low retrieval score below the retrieval score threshold to a low retrieval probability set;
   receiving a search term indicating a request for a subset of data objects of the plurality of data objects;
   determining, based on characteristics of the search term, a query search result probability indicating a probability of retrieving one or more data objects from the high retrieval probability set;
   combining the high retrieval probability set and the low retrieval probability set into a combined retrieval probability set based on the query search result probability, the combined retrieval probability set comprising both the first set of data objects and the second set of data objects; and
   retrieving, from the combined retrieval probability set, the subset of data objects of the plurality of data objects by querying the first set of data objects and the second set of data objects in the combined retrieval probability set in parallel.

2. The system of claim 1, wherein the retrieval score is generated by a machine learning model based at least on one or more of a message length, a term frequency-inverse document frequency (tf-idf) score, a historical group message search rate, a historical channel message search rate, a historical user message search rate, a historical user-channel message search rate, a user type, a message age, an activity notification, a message format, a message type, a reply count, or a message source.

3. The system of claim 1, wherein the method further comprises:
   generating a relevancy score for a data object of the plurality of data objects, the relevancy score representing a likelihood that the data object comprises one or more data object features matching to the search term.

4. The system of claim 1, wherein the method further comprises generating, a recency score for each data object of the plurality of data objects, the recency score representing a network timespan between a data object creation time and a search query receiving time.

5. The system of claim 1, wherein the method further comprises generating the combined retrieval probability set by querying the high retrieval probability set and the low retrieval probability set in parallel.

6. The system of claim 1, wherein the method further comprises ordering each data object of the combined retrieval probability set based on respective retrieval scores.

7. The system of claim 1, wherein the method further comprises transmitting subset of the plurality of data objects to a combined search results interface for rendering by a client device.

8. A computer-implemented method for generating tiered search index fields, comprising:
   receiving a plurality of data objects from a group-based communication system that supports messages exchanged between one or more users;
   generating a retrieval score for each data object of the plurality of data objects;
   assigning a first set of data objects of the plurality of data objects associated with a high retrieval score exceeding a retrieval score threshold to a high retrieval probability set;
   assigning a second set of data objects of the plurality of data objects associated with a low retrieval score below the retrieval score threshold to a low retrieval probability set;
   receiving a search term indicating a request for a subset of data objects of the plurality of data objects;
   determining, based on characteristics of the search term, a query search result probability indicating a probability of retrieving one or more data objects from the high retrieval probability set;
   combining the high retrieval probability set and the low retrieval probability set into a combined retrieval probability set based on the query search result probability, the combined retrieval probability set comprising both the first set of data objects and the second set of data objects; and
   retrieving, from the combined retrieval probability set, the subset of data objects of the plurality of data objects by querying the first set of data objects and the second set of data objects in the combined retrieval probability set in parallel.

9. The computer-implemented method of claim 8, wherein the retrieval score is generated by a machine learning model based at least on one or more of a message length, a term frequency-inverse document frequency (tf-idf) score, a historical group message search rate, a historical channel message search rate, a historical user message search rate, a historical user-channel message search rate, a user type, a message age, an activity notification, a message format, a message type, a reply count, or a message source.

10. The computer-implemented method of claim 8, further comprising:
generating a relevancy score for a data object of the plurality of data objects, the relevancy score representing a likelihood that the data object comprises one or more data object features matching to the search term.

11. The computer-implemented method of claim 8, further comprising generating a recency score for each data object of the plurality of data objects, the recency score representing a network timespan between a data object creation time and a search query receiving time.

12. The computer-implemented method of claim 8, further comprising generating the combined retrieval probability set by querying the high retrieval probability set and the low retrieval probability set in parallel.

13. The computer-implemented method of claim 8, further comprising ordering each data object of the combined retrieval probability set based on respective retrieval scores.

14. The computer-implemented method of claim 8, further comprising transmitting the subset of the plurality of data objects to a combined search results interface for rendering by a client device.

15. One or more non-transitory computer-readable media storing computer-executable instructions that, when executed by at least one processor, performs a method of generating tiered search index fields, comprising:
receiving a plurality of data objects from a group-based communication system that supports messages exchanged between one or more users;
generating a retrieval score for each data object of the plurality of data objects;
assigning a first set of data objects of the plurality of data objects associated with a high retrieval score exceeding a retrieval score threshold to a high retrieval probability set;
assigning a second set of data objects of the plurality of data objects associated with a low retrieval score below the retrieval score threshold to a low retrieval probability set;
receiving a search term indicating a request for a subset of data objects of the plurality of data objects;
determining, based on characteristics of the search term, a query search result probability indicating a probability of retrieving one or more data objects from the high retrieval probability set;
combining the high retrieval probability set and the low retrieval probability set into a combined retrieval probability set based on the query search result probability, the combined retrieval probability set comprising both the first set of data objects and the second set of data objects; and
retrieving, from the combined retrieval probability set, the subset of data objects of the plurality of data objects by querying the first set of data objects and the second set of data objects in the combined retrieval probability set in parallel.

16. The media of claim 15, wherein the retrieval score is generated by a machine learning model based at least on one or more of a message length, a term frequency-inverse document frequency (tf-idf) score, a historical group message search rate, a historical channel message search rate, a historical user message search rate, a historical user-channel message search rate, a user type, a message age, an activity notification, a message format, a message type, a reply count, or a message source.

17. The media of claim 15, wherein the method further comprises:
generating a relevancy score for a data object of the plurality of data objects, the relevancy score representing a likelihood that the data object comprises one or more data object features matching to the search term.

18. The media of claim 15, wherein the method further comprises generating, a recency score for each data object of the plurality of data objects, the recency score representing a network timespan between a data object creation time and a search query receiving time.

19. The media of claim 15, wherein the method further comprises generating the combined retrieval probability set by querying the high retrieval probability set and the low retrieval probability set in parallel.

20. The media of claim 15,
wherein the method further comprises ordering each data object of the combined retrieval probability set based on respective retrieval scores, and
wherein the method further comprises transmitting the subset of the plurality of data objects to a combined search results interface for rendering by a client device.

* * * * *